United States Patent
Nigro

(10) Patent No.: US 10,965,774 B2
(45) Date of Patent: Mar. 30, 2021

(54) AUTOMATED PLATFORM PROVISIONING SYSTEM

(71) Applicant: Hartford Fire Insurance Company, Hartford, CT (US)

(72) Inventor: Joseph Nicholas Nigro, Belchertown, MA (US)

(73) Assignee: Harford Fire Insurance Company, Hartford, CT (US)

(*) Notice: Subject to any disclaimer, the term of this patent is extended or adjusted under 35 U.S.C. 154(b) by 511 days.

(21) Appl. No.: 15/386,231

(22) Filed: Dec. 21, 2016

(65) Prior Publication Data

US 2018/0176078 A1 Jun. 21, 2018

(51) Int. Cl.
*G06F 15/177* (2006.01)
*H04L 29/08* (2006.01)
*H04L 12/24* (2006.01)

(52) U.S. Cl.
CPC ........ *H04L 67/303* (2013.01); *H04L 41/5051* (2013.01); *H04L 67/02* (2013.01); *H04L 67/10* (2013.01); *H04L 41/5096* (2013.01)

(58) Field of Classification Search
CPC ... H04L 67/303; H04L 41/5051; H04L 67/10; H04L 67/02; H04L 41/5096
USPC ....................................................... 709/222
See application file for complete search history.

(56) References Cited

U.S. PATENT DOCUMENTS

| | | | |
|---|---|---|---|
| 6,917,976 B1* | 7/2005 | Slaughter | G06F 9/465 709/226 |
| 9,063,791 B2 | 6/2015 | Dorai et al. | |
| 9,170,797 B2 | 10/2015 | Raman | |
| 2011/0265164 A1 | 10/2011 | Lucovsky et al. | |
| 2012/0266156 A1* | 10/2012 | Spivak | H04L 67/34 717/172 |
| 2013/0219068 A1 | 8/2013 | Ballani et al. | |
| 2014/0075032 A1* | 3/2014 | Vasudevan | H04L 41/5048 709/226 |
| 2015/0019742 A1 | 1/2015 | Douglas et al. | |
| 2015/0058467 A1 | 2/2015 | Douglas et al. | |
| 2016/0294732 A1 | 10/2016 | Chou et al. | |

* cited by examiner

*Primary Examiner* — Suraj M Joshi
*Assistant Examiner* — Jaren Means
(74) *Attorney, Agent, or Firm* — Buckley, Maschoff & Talwalkar LLC

(57) ABSTRACT

According to some embodiments, a system to automate platform provisioning for an enterprise includes a platform resource computer store containing a set of electronic data records (each including a component identifier and a set of computing characteristic values). A profile engine may receive a platform request from a user associated with the enterprise and identify, based on data in the platform resource computer store, a resource bundle of components appropriate in view of the platform request. A platform generator may receive platform requirements based on the identified resource bundle of components and provide input data to a REST API service. Final platform definition information for the enterprise may be stored into a central repository. According to some embodiments, a platform provisioning system may process IaaS and PaaS automation components and utilize a return service to generate infrastructure binding data to couple components in the resource bundle to each other.

18 Claims, 20 Drawing Sheets

AUTOMATED PLATFORM PROVISIONING SYSTEM

BACKGROUND

In some cases, an enterprise might want provide a computer platform to let employees, customers, etc. access various services. For example, a computer platform might include a web component, an application component, a database component, etc. that provide access to business information and/or allow for business information to be updated. Typically, an Information Technology ("IT") employee of the enterprise will determine the various components required to support a new computer platform. The IT employee might then request that sufficient hardware resources be provided to support these components. Note that this request might actually comprise several individual requests (e.g., one for a web server, another one for an application server, etc.), each of which might need individual approvals, review, etc. Moreover, the IT employee (or another user) might then need to configure the various components and/or hardware resources to ensure that the elements work together properly to create the desired platform. Such an approach, however, can be a time-consuming, expensive, and error-prone task—especially when a substantial number of potential platforms (of varying types and/or different functionality) need to be supported.

In addition, some hardware resources might be dedicated to computer platform that is rarely, if ever, used. For example, a designer might create a test version of a computer platform and arrange to have sufficient hardware resources dedicated to support the test platform. After he or she has finished testing the platform, however, there might not be a need to continue to use that particular platform. The enterprise might be reluctant to re-use the hardware resources for other purposes (e.g., because the test platform might need to be re-created at a later time, which can be a difficult task when various configuration parameters can only be found in supporting documentation, such as word processing files). As a result, an enterprise might find that a substantial amount of hardware resources are rarely, if ever, used.

It would be desirable to provide systems and methods to accurately and efficiently facilitate automated platform provisioning for an enterprise, while allowing for flexibility and effectiveness when creating, reviewing, and/or re-creating platforms as appropriate.

SUMMARY OF THE INVENTION

According to some embodiments, systems, methods, apparatus, computer program code and means are provided to automate platform provisioning for an enterprise. In some embodiments, a platform resource computer store contains a set of electronic data records (each including a component identifier and a set of computing characteristic values). A profile engine may receive a platform request from a user associated with the enterprise and identify, based on data in the platform resource computer store, a resource bundle of components appropriate in view of the platform request. A platform generator may receive platform requirements based on the identified resource bundle of components and provide input data to a REST API service. Final platform definition information for the enterprise may be stored into a central repository. According to some embodiments, a platform provisioning system may process IaaS and PaaS automation components and utilize a return service to generate infrastructure binding data to couple components in the resource bundle to each other.

Some embodiments comprise: means for receiving, at a profile engine computer, a platform request from a user associated with the enterprise; means for identifying, based on electronic data records in a platform resource computer store, a resource bundle of components appropriate in view of the platform request; means for outputting platform requirements based at least in part on the identified resource bundle of components; means for receiving, by a platform generator system computer, the platform requirements from the profile engine computer; means for providing input data to an asynchronous representational state transfer application programming interface service; means for storing final platform definition information for the enterprise into a central repository; means for processing, by a platform provisioning system computer, Infrastructure-as-a-Service automation components; means for processing, by the platform provisioning system computer, Platform-as-a-Service automation components; and means for utilizing a return service to generate infrastructure binding data to couple components in the resource bundle to each other.

In some embodiments, a communication device associated with a back-end application computer server exchanges information with remote devices. The information may be exchanged, for example, via public and/or proprietary communication networks.

Some technical effects of some embodiments of the invention are improved and computerized ways to accurately and efficiently facilitate automated platform provisioning for an enterprise. With these and other advantages and features that will become hereinafter apparent, a more complete understanding of the nature of the invention can be obtained by referring to the following detailed description and to the drawings appended hereto.

DETAILED DESCRIPTION

The present invention provides significant technical improvements to facilitate electronic messaging and dynamic data processing. The present invention is directed to more than merely a computer implementation of a routine or conventional activity previously known in the industry as it significantly advances the technical efficiency, access and/or accuracy of communications between devices by implementing a specific new method and system as defined herein. The present invention is a specific advancement in the area of one or more electronic data record management and assignment by providing benefits in data accuracy, data availability and data integrity and such advances are not merely a longstanding commercial practice. The present invention provides improvement beyond a mere generic computer implementation as it involves the processing and conversion of significant amounts of data in a new beneficial manner as well as the interaction of a variety of specialized client and/or third party systems, networks and subsystems. For example, in the present invention information may be processed, managed, and/or used to provision resources, such as computing components, and results may then be analyzed accurately and used to create and/or re-create computer systems, thus improving the overall performance of an enterprise (e.g., by improving the effectiveness and/or reducing the number of messages that need to be transmitted via a network and/or communication links). Moreover, embodiments might further improve technical performance values of a platform (e.g., response times, scalability, etc.), reduce an amount of time required to create or re-create a platform, allow a user with relatively limited Information Technology ("IT") experience create a robust system, improve resource allocation decisions, reduce wasted storage, memory, and/or processing capacity (e.g., because such systems may be more readily released for other uses), etc.

In some cases, an enterprise might want provide a computer platform to let employees, customers, etc. access various services. Typically, an IT employee of the enterprise will determine the various components required to support a new computer platform and then request that sufficient hardware resources be provided to support these components. The IT employee (or another user) can then configure the various components and/or hardware resources to ensure that the elements work together properly to create the desired platform. Such an approach, however, can be a time-consuming, expensive, and error-prone process—especially when a substantial number of potential platforms (of varying types and/or different functionality) need to be supported.

Figure 1:
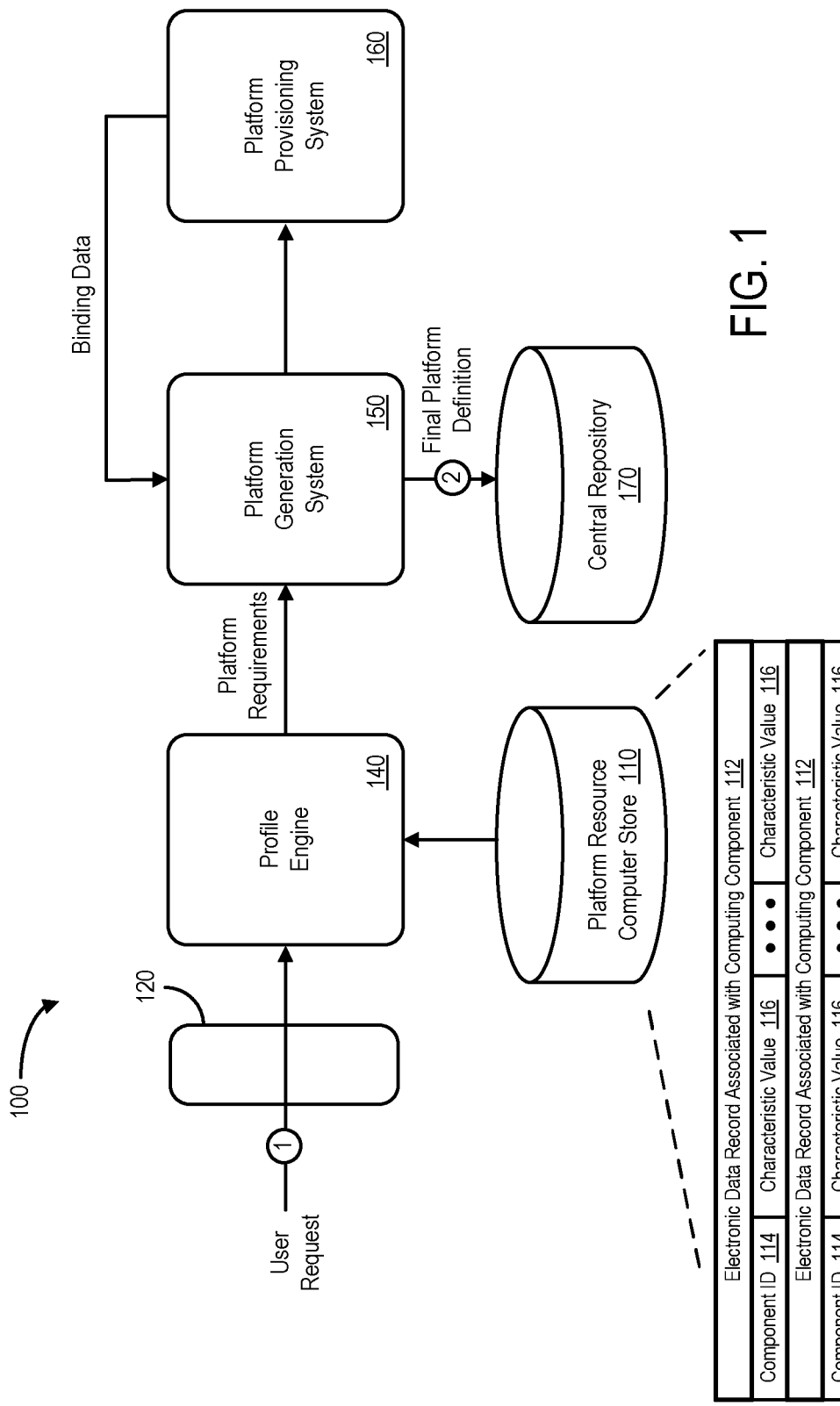
FIG. 1 is a high-level block diagram of an automated platform provisioning system according to some embodiments.

It would be desirable to provide systems and methods to accurately and efficiently facilitate automated platform provisioning for an enterprise, while allowing for flexibility and effectiveness when creating, reviewing, and/or re-creating platforms as appropriate. FIG. 1 is a high-level block diagram of a system 100 according to some embodiments of the present invention. In particular, the system 100 includes a profile engine 140 that may access information in a platform resource computer store 110 (e.g., storing information about potential computer platform characteristics, available hardware resources, etc.). The profile engine 140 may also exchange information with remote a remote user (e.g., via a firewall 120). According to some embodiments, a back-end application computer server of the profile engine 140 may facilitate viewing, receiving, and/or interacting with information via one or more terminals associated with the user. According to some embodiments, the profile engine 140 (and/or other devices described herein) might be associated with a third party, such as a vendor that performs a service for an enterprise.

The profile engine 140 and/or other devices described herein might be, for example, associated with a Personal Computer ("PC"), laptop computer, smartphone, an enterprise server, a server farm, and/or a database or similar storage devices. According to some embodiments, an "automated" profile engine 140 may facilitate an automated provisioning of a computer platform based on electronic data records in the platform resource computer store 110. As used herein, the term "automated" may refer to, for example, actions that can be performed with little (or no) intervention by a human.

As used herein, devices, including those associated with the profile engine 140 and/or any other device described herein may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The profile engine 140 may store information into and/or retrieve information from the platform resource computer store 110. The platform resource computer store 110 might, for example, store electronic records associated with various computing components 112, including, for example, component identifiers 114 and component characteristic values 116 (e.g., associated with computing speed, processing power, etc.). The platform resource computer store 110 may be locally stored or reside remote from the profile engine 140. As will be described further below, the platform resource computer store 110 may be used by the profile engine 140 to help manage and assign risk relationships. Although a single profile engine 140 is shown in FIG. 1, any number of such devices may be included. Moreover, various devices described herein might be combined according to embodiments of the present invention. For example, in some embodiments, the profile engine 140 and platform resource computer store 110 might be co-located and/or may comprise a single apparatus.

The profile engine 140 may communicate with a platform generation system 150, such as by transmitting platform requirements to the platform generation system 150 (e.g., based on a user request and information in the platform resource computer store 110). The platform generation system 150 may, as will be described, transmit information to a platform provisioning system 160 and/or store a final platform definition into a central repository 170. According to some embodiments, the platform provisioning system 160 may also transmit information to the platform generation system 150, such as binding data to help various components work together.

According to some embodiments, the system 100 may let a user initiate an automated platform provisioning process for an enterprise. In particular, at (1) a user may transmit a user request to the profile engine 140. The user request might, for example, describe how a platform should operate, the performance requirements associated with the desired platform, etc. As will be described, the elements of the system 100 may then act to eventually generate a final platform definition which may then be stored into the central repository at (2). The final platform definition might, for example, completely create a platform that performs as appropriate in view of the user request received at (1).

Figure 2:
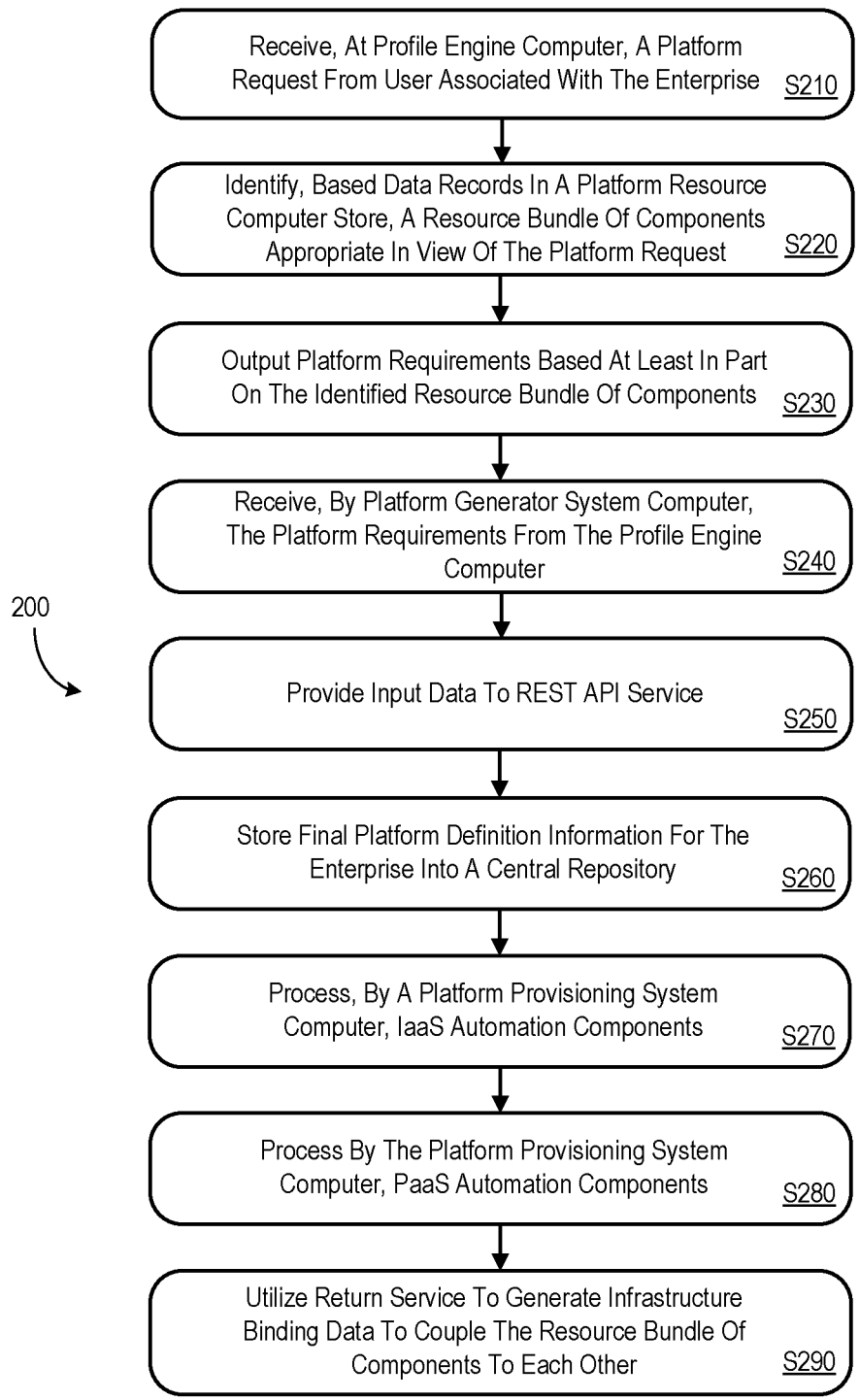
FIG. 2 illustrates an automated platform provisioning method according to some embodiments.

Note that the system 100 of FIG. 1 is provided only as an example, and embodiments may be associated with additional elements or components. According to some embodiments, the elements of the system 100 may automatically facilitate the creation of a computer platform for an enterprise. For example, FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a profile engine computer may receive a platform request from a user associated with the enterprise. The user might, for example, indicate that he or she would like to have a platform created that performs certain functions for the enterprise. As will be described, the platform request might be associated with, for example: a standardized service template, a pre-defined profile, a customized profile, a set of individual micro infrastructure service definitions, platform input data, a user defined filter, an application profile, and/or a questionnaire (e.g., completed by a user to indicate how he or she thinks the platform needs to operate within the enterprise). According to some embodiments, the platform request is associated with: a framework template, a runtime template, a middleware template, an Operating System ("OS") template, a native service template, a load balanced, auto-scaled website, a Relational Database Management System ("RDBMS"), a JBoss stack, layer, instances, and associated resources, website hosting with Domain Name Services ("DNS") entry, and/or identity and access management. According to some embodiments, the platform request is associated with a base service level (e.g., high, medium, or low level of service), a multiplier (e.g., to increase or decrease the base service level as needed), and at least one "service offering extension." As used herein, the phrase "service offering extension" might refer to, for example, functionality associated with: availability, security, performance, agility, workload, support, capabilities, cost, and/or monitoring ability.

At S220, the profile engine computer may identify, based on electronic data records in a platform resource computer store, a resource bundle of components appropriate in view of the platform request. According to some embodiments, the identified resource bundle of components includes a web server, an application server, and a database server. For example, the web server might be associated with a first virtual machine of a web hosting tier. Similarly, the application server might be associated with a second virtual machine of an application container tier while the database server is associated with a third virtual machine of a database instance tier. According to other embodiments, the resource bundle of components might further include a network component, a network balancer, middleware services, etc.

At S230, the profile engine computer may output platform requirements based at least in part on the identified resource bundle of components. At S240, a platform generator system computer may receive the platform requirements from the profile engine computer. For example, the output requirements might indicate a number of hardware servers, memory, etc. required to support the platform requested by the user. At S250, the platform generator system computer may provide input data to an asynchronous Representational State Transfer ("REST") Application Programming Interface ("API") service. As used herein, the phrase "REST API" might be associated with, for example, a way of providing interoperability between computer systems on the Internet. The REST API might let requesting systems access and manipulate textual representations of web resources using a uniform and predefined set of stateless operations. According to some embodiments, the REST API is associated with Web Service Definition Language ("WSDL") statements.

At S260, the platform generator system computer may store final platform definition information for the enterprise into a central repository. Note that the final platform definition information might only be determined (and stored) after all of the steps of the method 200 of FIG. 2 have been performed. According to some embodiments, the central repository is further to provide feedback data to the profile engine computer. For example, the feedback might, to improve future performance of the platform provisioning system, including a component add, a component change, a component delete, etc.

At S270, a platform provisioning system computer may process Infrastructure-as-a-Service ("IaaS") automation components. As used herein, the term "IaaS" might refer to, for example, a basic cloud-service model of providers offering computing infrastructure—virtual machines and other resources—as a service to subscribers. For example, IaaS might refer to online services that abstract a user from the details of infrastructure (e.g., physical computing resources, location, data partitioning, scaling, security, backup, etc.). According to some embodiments, IaaS resources may be provided on-demand from large pools of equipment installed in data centers. By way of example only, the IaaS automation components might be associated with compute, network, and/or storage abilities.

At S280, the platform provisioning system computer may process Platform-as-a-Service ("PaaS") automation components. As used herein, the term "PaaS" might be associated with, for example, a computing platform that typically includes an OS, programming-language execution environment, database, and web server. In some cases, the underlying computer and storage resources may scale automatically to match application demand so that a user does not have to allocate resources manually. According to some embodiments, the PaaS automation components are associated with object storage, identity, runtime, queue, database, cloud modeling framework, data types, common data types, common errors, regions and endpoints, etc.

At S290, the platform provisioning system computer may utilize a return service to generate infrastructure binding data to couple components in the resource bundle to each other. The binding of resources to each other might be associated with, for example, a request proxy, a datasource, an IP address, a port range, etc.

Figure 3:
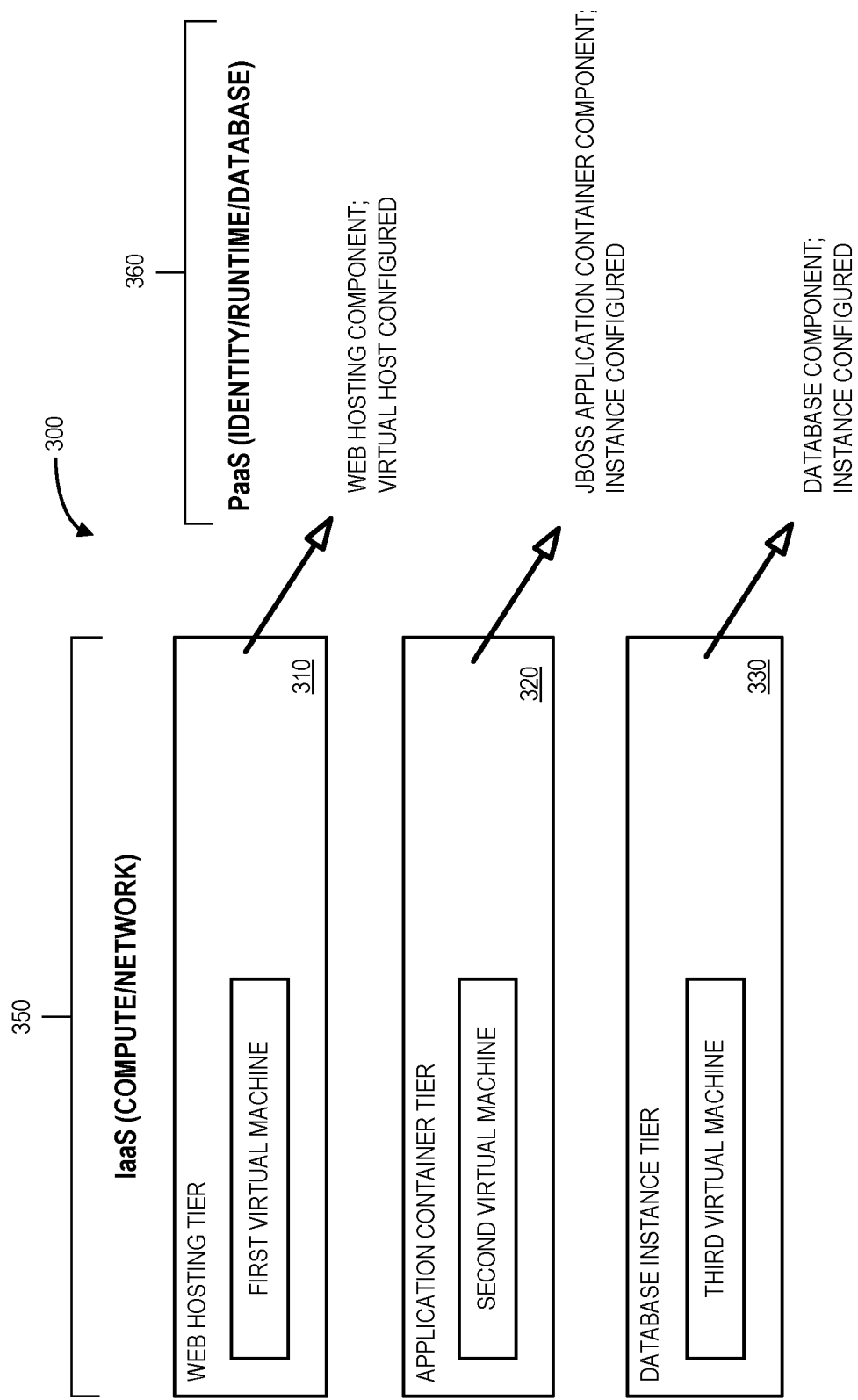
FIG. 3 illustrates a PaaS prototype use case with a standard profile in accordance with some embodiments.

The method of FIG. 2 might be associated with any number of different types of network and/or data topologies. For example, FIG. 3 illustrates a PaaS prototype use case 300 with a standard profile in accordance with some embodiments. In this example, an IaaS portion 350 might be associated with compute and/or network functionality while a PaaS portion 360 is associated with identity, runtime, and/or database functionality. The IaaS portion 350 might include, for example, a web hosting tier 310 including a first virtual machine that is associated with a web hosting component (virtual host configured) in the PaaS portion 360. Similarly, the IaaS portion 350 might include an application container tier 320 including a second virtual machine that is associated with a JBoss application container component (instance configured) in the PaaS portion 360. The JBoss application container component might, for example, be associated with a portfolio of enterprise-class application and integration middleware software products used by end users to create applications; integrate applications, data, and devices; and/or automate business processes. In addition, the IaaS portion 350 might include database instance tier 330 including a third virtual machine that is associated with a database component (instance configured) in the PaaS portion 360.

Figure 4:
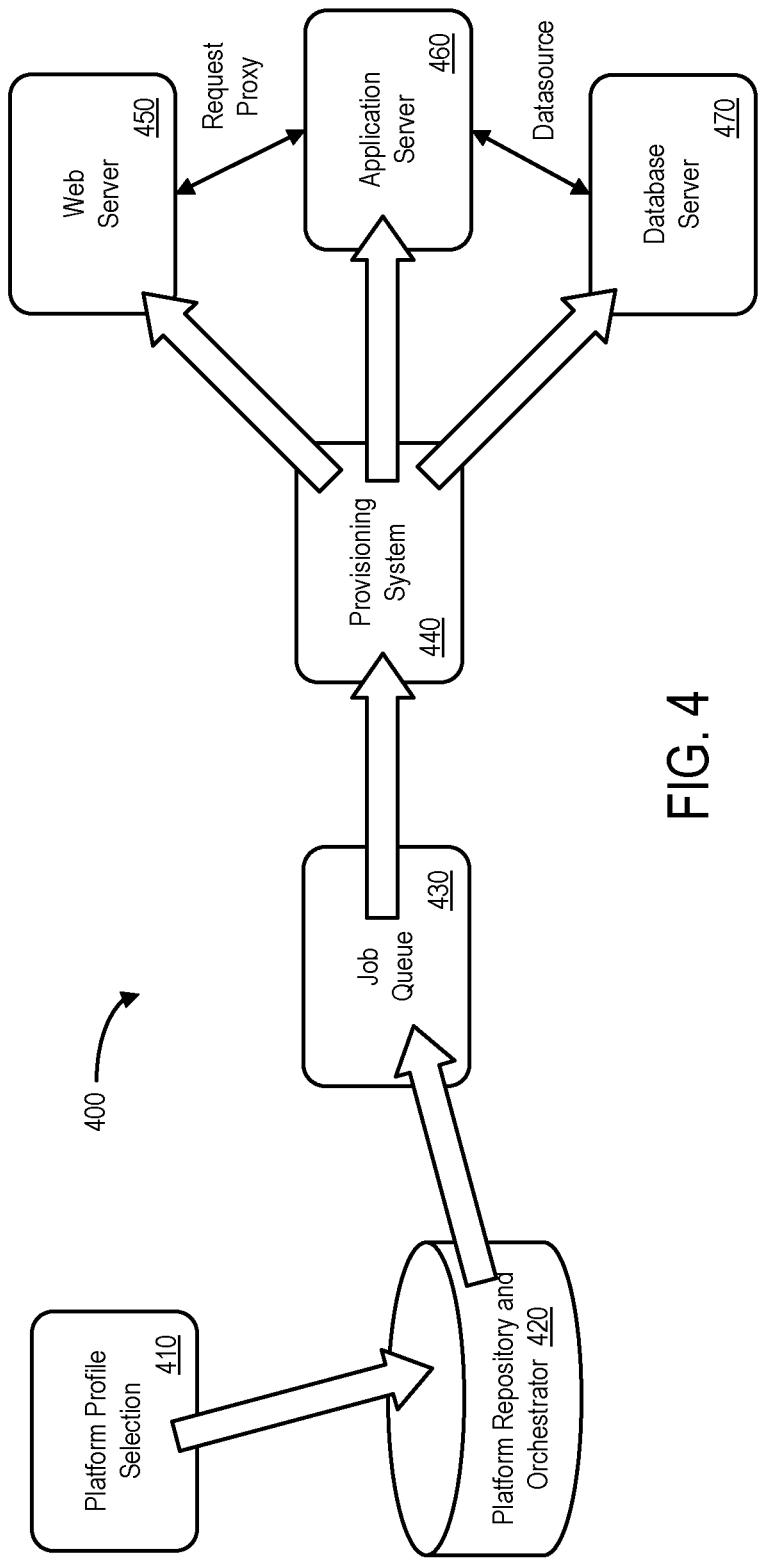
FIG. 4 is an information flow diagram for a PaaS prototype system according to some embodiments.

FIG. 4 is an information flow diagram 400 for a PaaS prototype system according to some embodiments. A platform profile selection element 410 may, for example, let a user request a PaaS performance profile. Upon receiving the request, a build of a bundled platform may be initiated and the system may store information into a platform repository and orchestrator 420. That information might then be used to create a job queue 430 (e.g., a queue of jobs to create a platform such that REST APIs make calls as appropriate) that eventually provides information used by a provisioning system 440. The provisioning system 440 may then create a web server 450, an application server 460, and a database server 470. The web server 450 and application server 460 might be bound, for example, by a request proxy. The application server 460 and the database server 470 might be bound, for example, by a datasource. As a result, the flow diagram 400 may provide an ability to rapidly provision, in response to a user request, a standard profile consisting of commonly used enterprise platforms.

Figure 5:
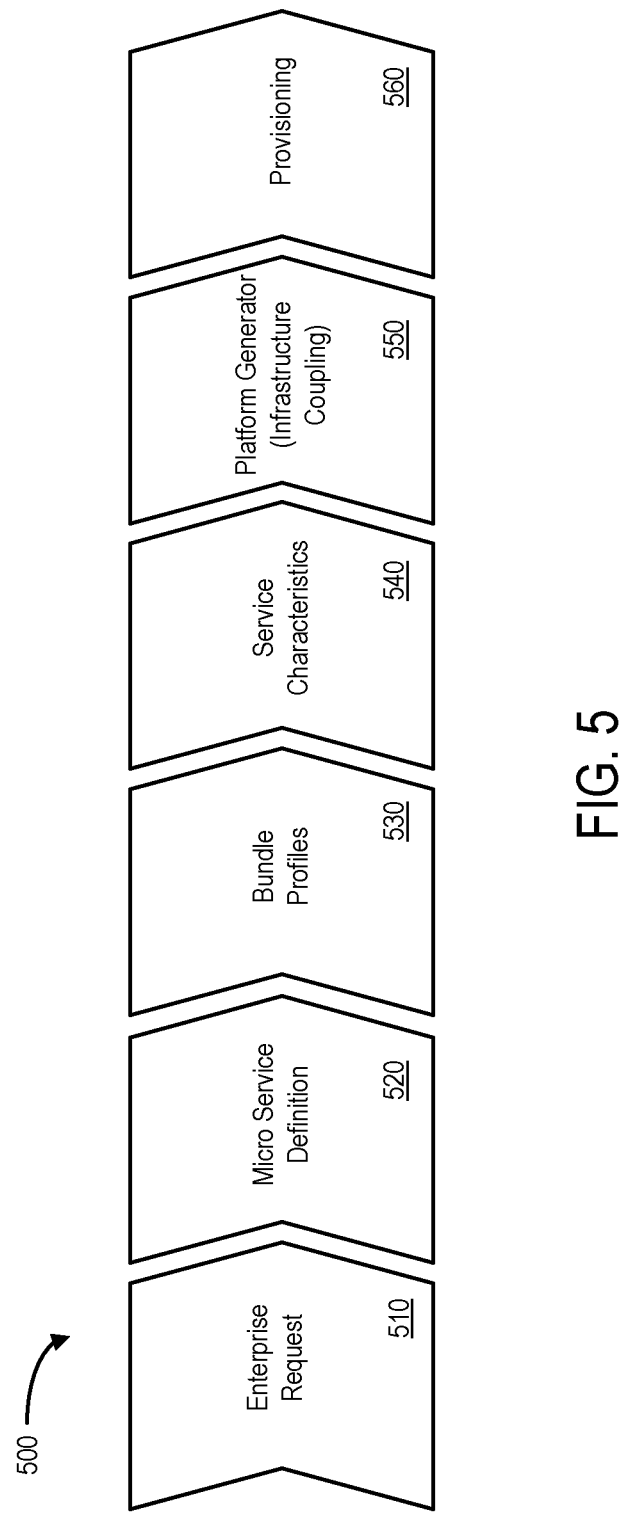
FIG. 5 is an example of how business requirements might be processed into a provisioning result in accordance with some embodiments.

FIG. 5 is an example 500 of how business requirements might be processed into a provisioning result in accordance with some embodiments. Initially, an enterprise request 510 might be received from a user who is interested in establishing a platform for an enterprise. A micro service definition 520 might then be performed to determine, for example, which small, independent processes should communicate with each other (e.g., using language agnostic APIs) to achieve functionality for the platform. That is, instead of using a monolithic service that puts all functionality into single process, embodiments may use a micro service architecture to place various elements into separate processes. As a result, a scalable implementation may be provided by distributing these services across servers and replicating them as needed. A bundle profiles 530 process may then be performed to map service infrastructure definitions. Note that service templates may define individual services to be consumed. The service bundle profiles 530 may establish and enforce effective standardization as well as: provide clear, consistent descriptions for service requests, provide repeatable, predictable deployments and service level agreements, appropriately identify costs associated with services, and/or enable a transfer of IT to a service provider.

One or more service characteristics 540 may then be determined. The service characteristics 540 may, for example, let a business user choose service levels that best match a platform's requirements (e.g., in terms of availability, security, performance, etc.). A platform generator 550 may then provide infrastructure coupling (e.g., in connection with a binding generator). The platform generator 550 may, for example, provide data to a REST API for provisioning and receive data back from a provisioning system 560 that ultimately couples the components and services together to create a final platform definition.

Figure 6:
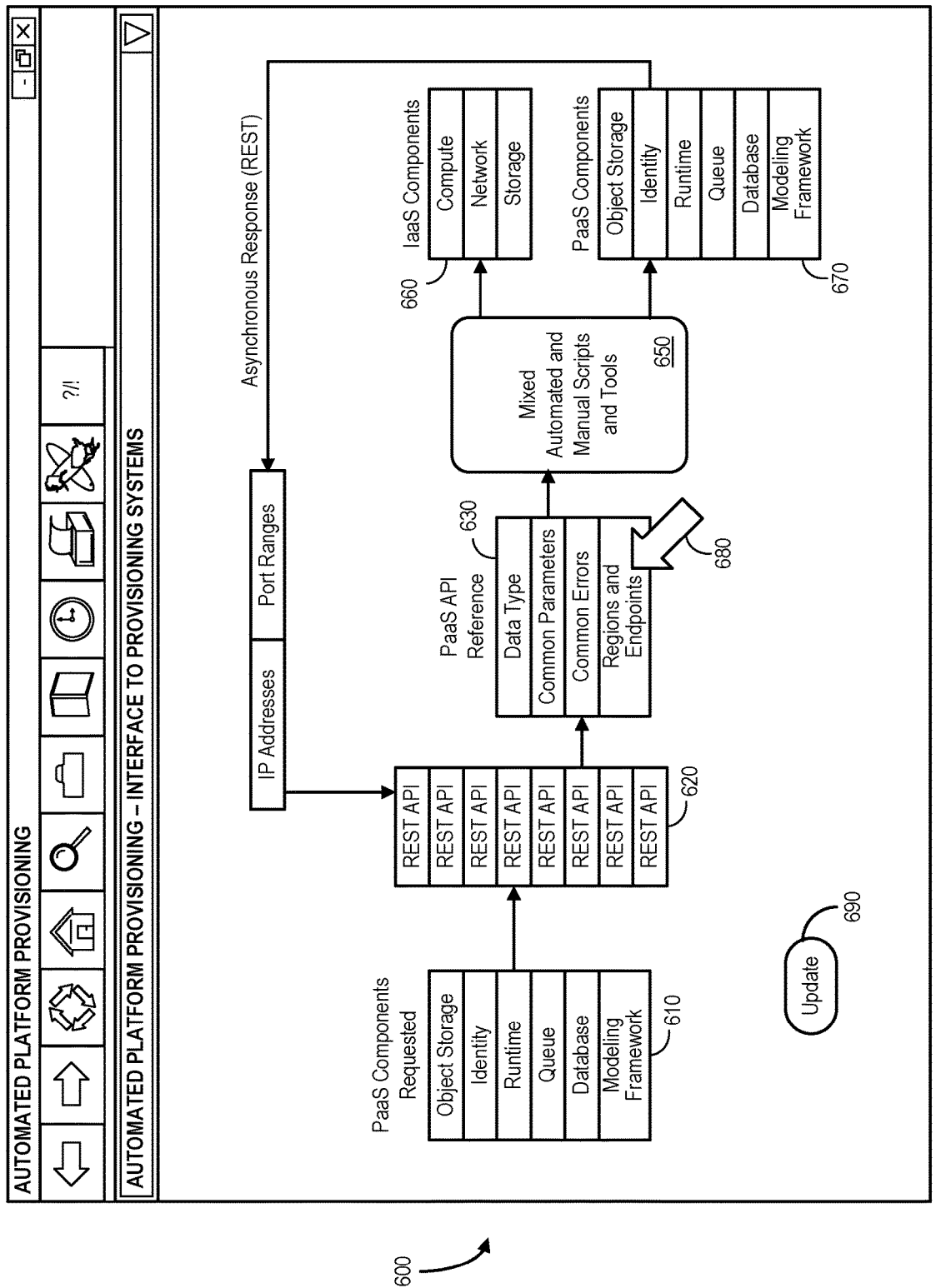
FIG. 6 illustrates an interactive graphical user interface display associated with a provisioning system according to some embodiments.

Thus, embodiments described herein may let a user ask to have an appropriate platform automatically provisioned for an enterprise (e.g., by having the system identify and provide resources to create the platform). According to some embodiments, a communication port coupled to a profile engine computer may also facilitate an exchange of electronic messages, via a distributed cloud-based communication network, to present an interactive Graphical User Interface ("GUI") at a remote user terminal associated with the user. For example, FIG. 6 illustrates an interactive GUI display 600 associated with a provisioning system according to some embodiments. In particular, PaaS components requested 610 might include, for example, object storage, identity, runtime, queue, database, and/or modeling framework functionality. These may result in a stack of appropriate REST APIs 620 that create PaaS API references 630 (e.g., associated with a data type, common parameters, common errors, regions and endpoints, etc.) that are provided to mixed automated and manual scripts and tools 650. The mixed automated and manual scripts and tools 650 may create IaaS components 660 (e.g., compute, network, storage, etc.) and PaaS components 670 (e.g., object storage, identity, runtime, queue, database, modeling framework, etc.). The PaaS components 670 may, for example, provide an asynchronous response (via REST APIs) to pass IP addresses, port ranges, etc. to the REST API stack 620. According to some embodiments, a user might select a portion of the display 600 (e.g., via a computer mouse pointer 680) to receive further information about that portion. Moreover, a user might select one or more icons 690 to update data, save data, export data, etc.

Figure 7:
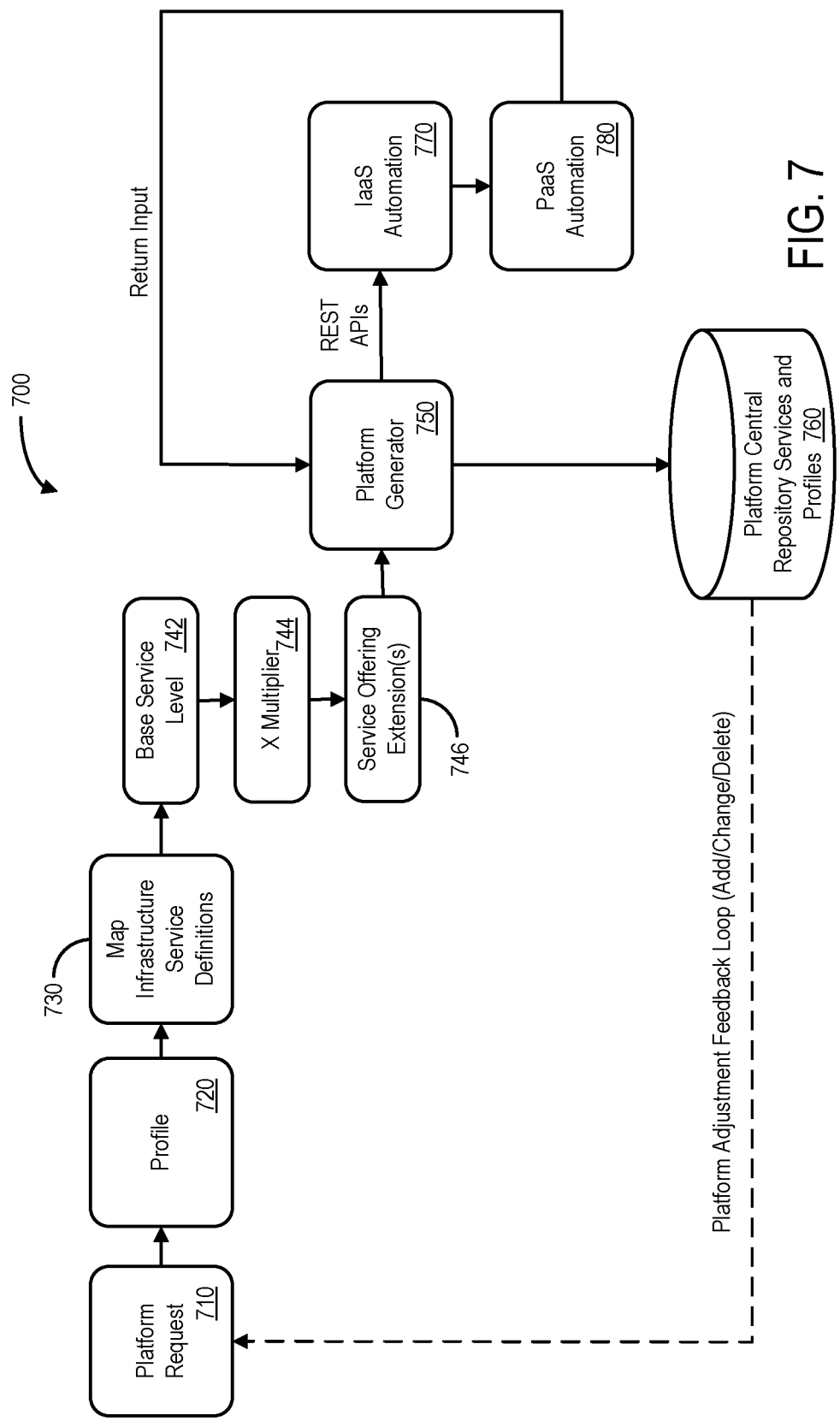
FIG. 7 is a high level information flow demonstrating how business requirements might be processed into a provisioning result in accordance with some embodiments.

FIG. 7 is a high level information flow 700 demonstrating how business requirements might be processed into a provisioning result in accordance with some embodiments. An enterprise platform request 710 may be received from a user, such as by receiving a user selection of a web application bundle via an on demand portal of items available in a business catalogue. The request may be processed into a profile 720 (e.g., a bundle may be matched to a pre-defined profile and/or matched to a set of individual infrastructure services). According to some embodiments, the system may also map one or more infrastructure service definitions 730. For example, service templates might define each individual service to be consumed. Such an approach may help establish standardization and provide clear, consistent descriptions for all service aspects.

According to some embodiments, a base service level 742 might be requested and modified by a multiplier 744. For example, a user might select a service level and/or sizing that best fit a platform being created. One or more service offering extensions 746 might also be requested by a user (e.g., associated with security, availability, cost, etc.). This information may be consumed by a platform generator 750 that provides input data to REST API services that call provisioning systems, such as an IaaS automation 770 and/or a PaaS automation 780. A separate return REST service may collect the infrastructure binding data that ultimately couples the components and services together to create a final platform definition that is stored by the platform generator 750 into a platform central repository services and profiles 760 storage element. Note that the final platform definition might also be used to perform a platform adjustment feedback (e.g., to add, change, and/or delete components as appropriate in connection with future user platform requests).

Figure 8:
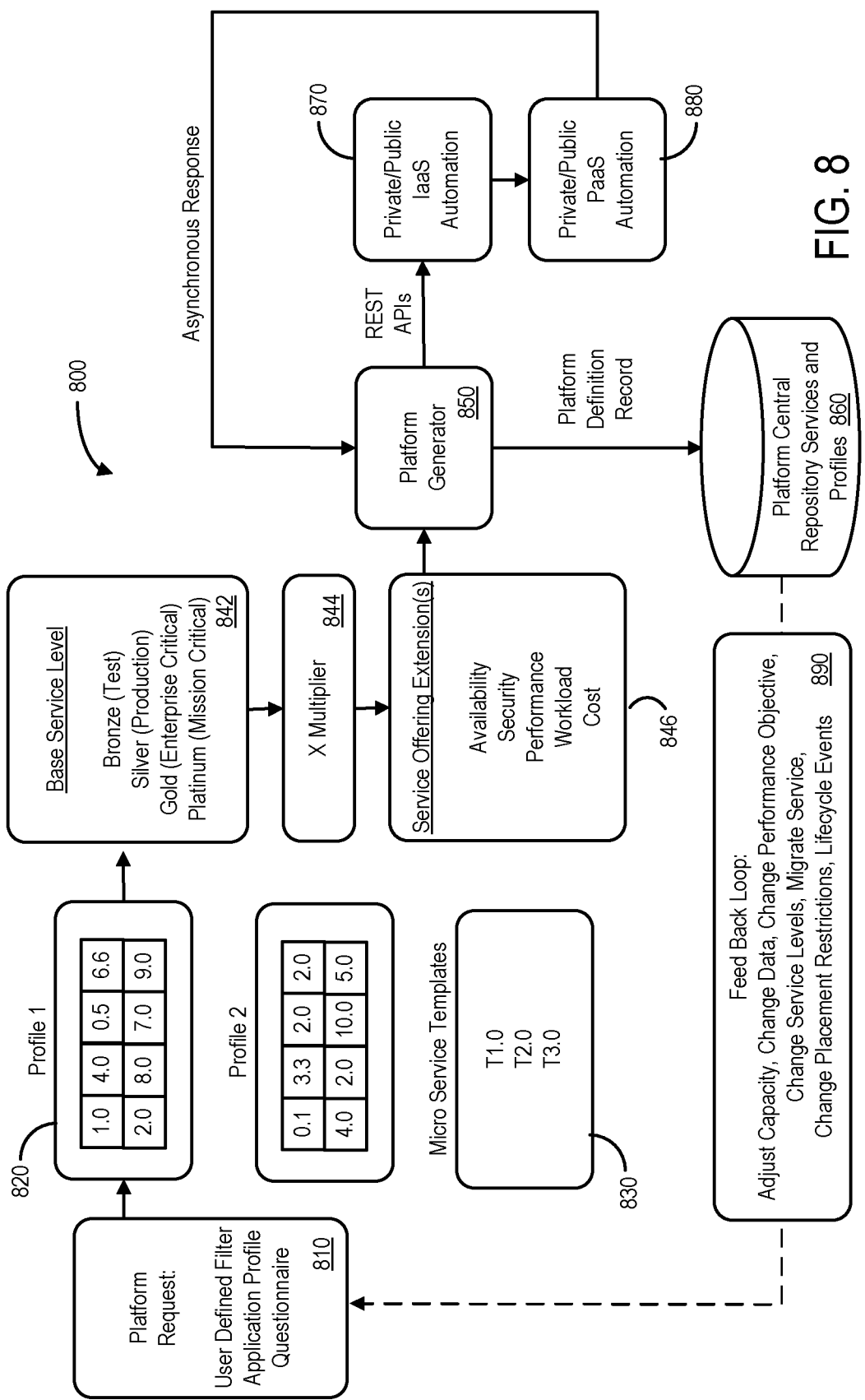
FIG. 8 is a more detailed example of how business requirements might be processed into a provisioning result according to some embodiments.

FIG. 8 is a more detailed example 800 of how business requirements might be processed into a provisioning result according to some embodiments. As before, a platform request 810 may be received from a user, such as by receiving a user defined filter, application profile, questionnaire, etc. The request may be processed into an appropriate profile 820 (e.g., with different profiles 820 being associate with various performance values) and/or micro service templates 830. According to some embodiments, a base service level 842 might be requested and modified by a multiplier 844. For example, a user might request a bronze service level (associated with a test environment), a silver service level (associated with a production environment), a gold service level (for enterprise critical tasks), a platinum service level (for mission critical tasks), etc. One or more service offering extensions 846 might also be requested by a user (e.g., associated with security, availability, cost, etc.). This information may be consumed by a platform generator 850 that provides input data to REST API services that call provisioning systems, such as a public and/or private IaaS automation 870 and/or a public and/or private PaaS automation 880. A separate return REST service (asynchronous response) may collect the infrastructure binding data that ultimately couples the components and services together to create a final platform definition that is stored by the platform generator 850 into a platform central repository services and profiles 860 storage element. Note that the final platform definition might also be used to perform a platform adjustment feedback loop 890 (e.g., to add capacity, change data, change a performance objective, change a service level, migrate a service, change placement restrictions, establish lifecycle events, etc.).

Figure 9:
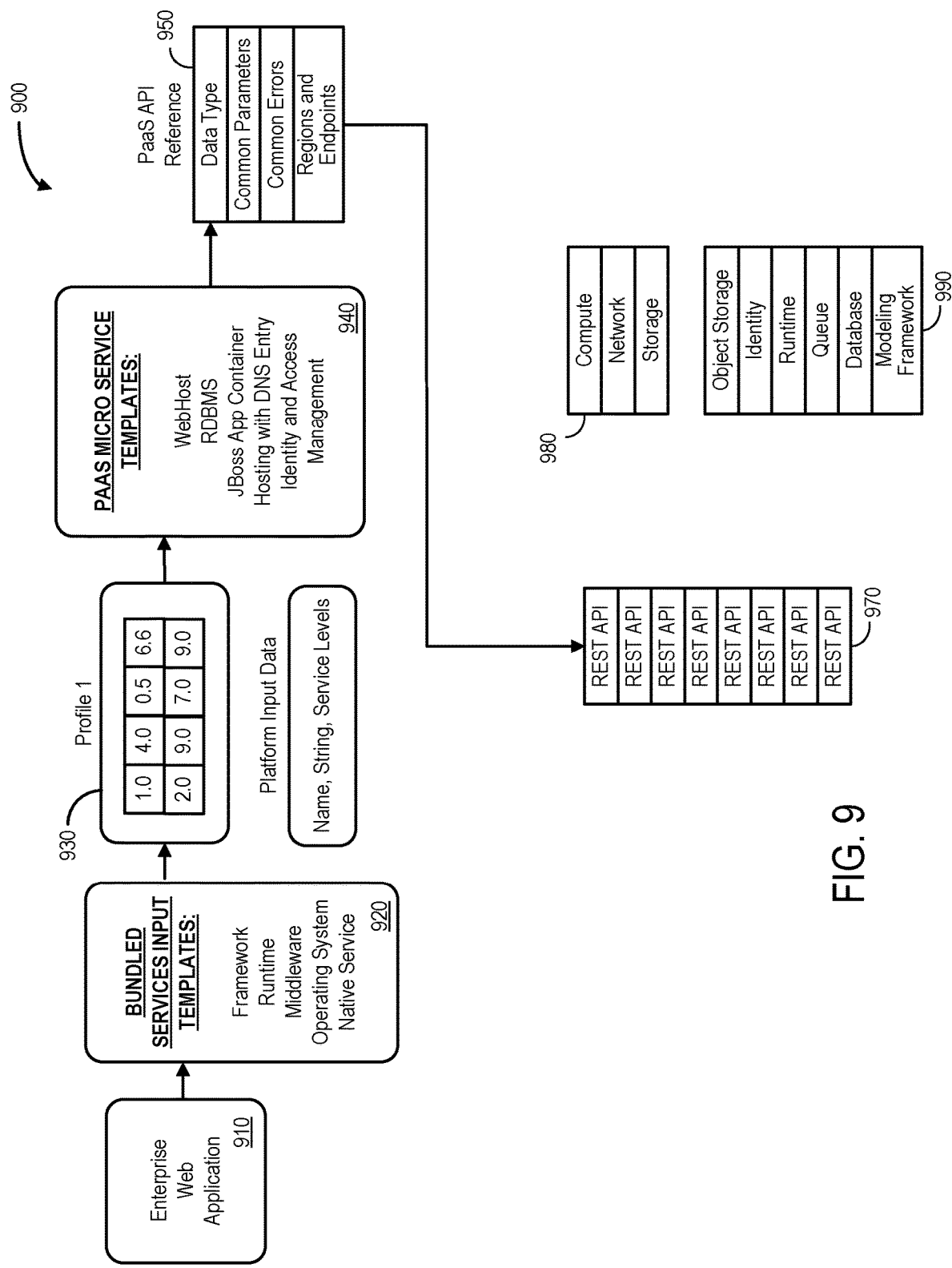
FIG. 9 is an ecosystem model for an automated provisioning system in accordance with some embodiments.

FIG. 9 is an ecosystem model 900 for an automated provisioning system in accordance with some embodiments. Once again, a platform request might be received from a user via an enterprise web application 910. The request may be processed via one or more bundled services input templates 920 (e.g., templates associated with a framework, runtime, middleware, OS, native service, etc.) into an appropriate profile 930 and/or platform input data (e.g., a name, string, service levels, etc.). According to some embodiments, a PaaS micro service template 940 might also be selected (e.g., associated with WebHost, RDBMS, a JBoss application container, hosting with a DNS entry, identity and access management, etc.). Moreover, PaaS API reference information 950 might be determined (e.g., associated with data type, common parameters, common errors, regions and endpoints, etc.) and, according to some embodiments, used to generate one or more WSDL statements. The model 900 may further include REST APIs 970 as well as data associated with an asynchronous response (e.g., compute, network, and storage data 980 and/or object storage, identity, runtime queue, database, and modeling framework data 990).

Figure 10:
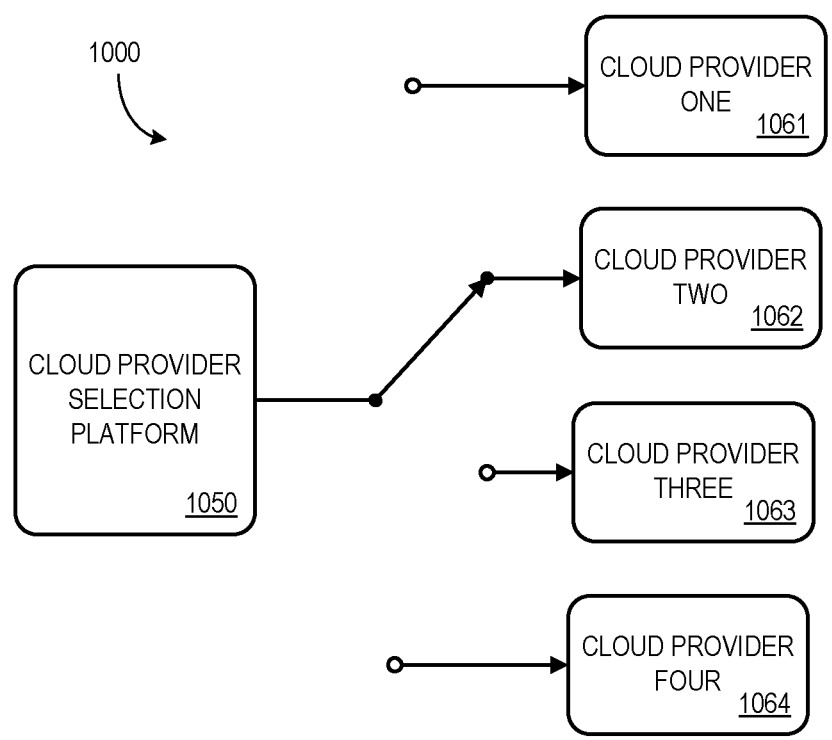
FIG. 10 illustrates an ability to select different cloud providers according to some embodiments.

FIG. 10 illustrates 1000 an ability to select different cloud providers according to some embodiments. According to some embodiments, an automated platform generator may be capable of securely communicating with internal and/or external cloud providers in any protocol commonly available. This includes, but is not limited, to REST, Simple Object Access protocol ("SOAP"), HTTPPost, and SSH. Cloud Providers may or may not use a standard interface for platform services, and different IaaS providers may seek differentiation by using their own Application Programming Interfaces ("APIs"). In particular, a cloud selection platform 1050 might be used to connect to one or more of a first cloud provider 1061, a second cloud provider 1062, a third cloud provider 1063, a fourth cloud provider 1064, etc. An open protocol design may help avoid being locked into a particular vendor interface and might accommodate any protocol/parameter specified by the cloud provider. Additionally, an automated platform generator may isolate application requests for platform services as much as possible from the rest of the logic so that providers can be changed without a substantial impact.

Figure 11:
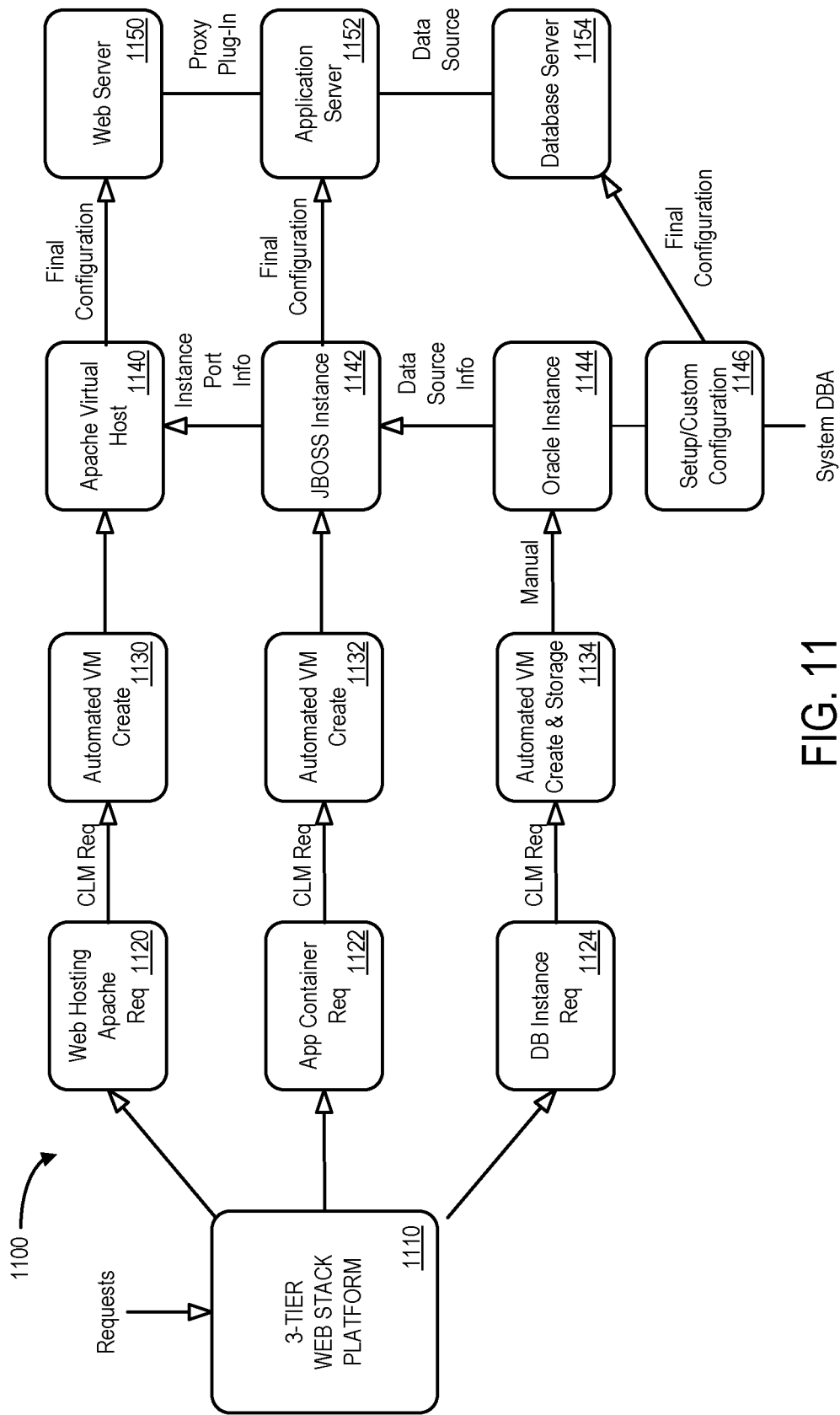
FIG. 11 is an example of a platform request processing system in accordance with some embodiments.

FIG. 11 is an example of a platform request processing system 1100 in accordance with some embodiments. In particular, a 3-tier web stack platform 1110 may receive a request and, in response, generate a web hosting Apache request 1120, an app container request 1122, and a database instance request 1124. The web hosting Apache request 1120 may trigger a CLM request to an automated virtual machine create process 1130 that will establish an Apache virtual host 1140. The apache virtual host 1140 may provide final configuration information to a web server 1150. The app container request 1122 may trigger a CLM request to an automated virtual machine create process 1132 that will establish JBOSS instance 1142. The JBOSS instance 1142 may provide final configuration information to an application server 1152 and instance port information to the Apache virtual host 1140. The database instance request 1124 may trigger a CLM request to an automated virtual machine create and storage process 1134 that will establish an Oracle instance 1144. The Oracle instance 1144 may provide final configuration information to a database 1150 via a setup/custom configuration process 1146 (e.g., in accordance with input from a system DataBase Administrator ("DBA")). The Oracle instance 1144 may also provide data source information to the JBOSS instance. Note that a proxy plug-in might bind the web server 1150 to the application server 1152 and datasource information might bind the application server 1152 to the database server 1154

Figure 12:
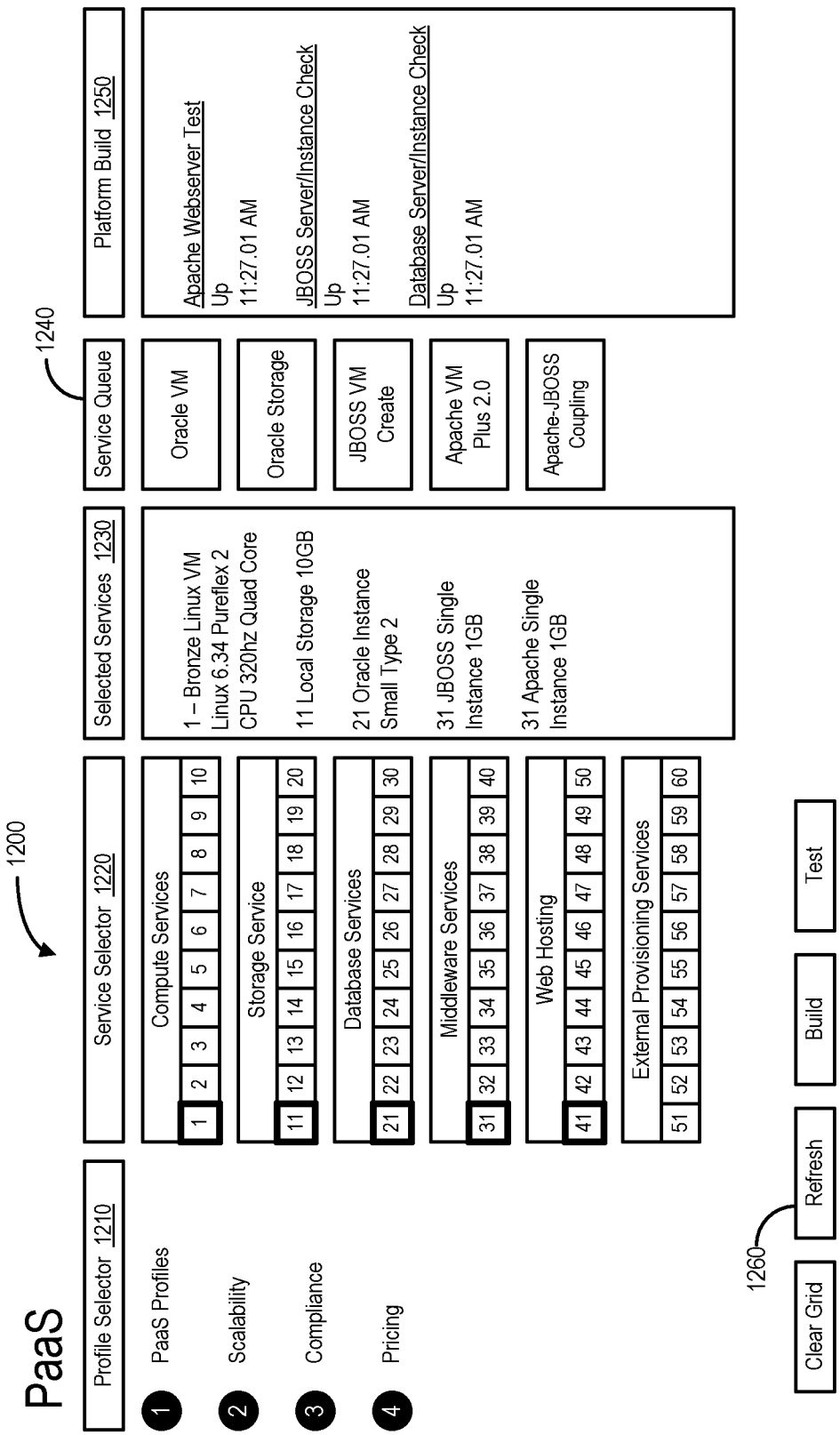
FIG. 12 illustrates a platform provisioning interface according to some embodiments.

FIG. 12 illustrates a platform provisioning interface 1200 according to some embodiments. A profile selector area 1210 might facilitate selection and/or exchange of PaaS profiles, scalability information, compliance information, and/or pricing information. A service selector area 1220 may let a user request computing resources for compute services, storage services, database services, middleware services, web hosting, external provisioning services, etc. For example, a user might select that one unit of computing resources (e.g., number "31") be allocated to middleware services (as illustrated by the dark line in FIG. 12). The interface 1200 may also include a selected services area 1230 that details the computing resources assigned to the platform (e.g., by indicating that 10 GB of local storage are allocated to the platform). A service queue area 1240 might list the tasks that have been, are being, or will be performed to the create the platform. A platform build area 1250 might indicate the current status of various platform components (e.g., a web server, an application server, a database server, etc.). The interface 1200 may also include user-selectable icons 1260 to "Clear Grid," "Refresh" the display, "Build" a platform, "Test" a configuration, etc.

Thus, embodiments may provide a REST-based platform definition and configuration system that uses REST, micro-services, and/or a No-SQL repository to rapidly provision a standard platform profile consisting of an application server, a web server, and a database server with a single user action (e.g., a single click of a computer mouse). Each of the platforms involved (application server, web server, and database server) are automatically "wired together" to function as a usable platform. An automated platform generator may host complex infrastructure services that are composed of small independent processes communicating with each other using micro-services that are small, highly decoupled, and focused on doing a small task. The interface may provide an ability to add, update, and/or delete (or decommission) components, as well as provide component definition data that can be used for pricing, compliance, and/or monitoring of the platform. The automated delivery of complete usable platforms provisioned using predefined templates may help ensure the integrity of the platform and help reduce delivery delay due to independent component and human processes. Note that the components and services that can be ordered, provisioned, and/or tracked in accordance with embodiments described herein may be virtually limitless.

Moreover, embodiments described herein may help a user re-create or re-establish an appropriate platform (with the needed components and hardware resources) for an enterprise in an automated fashion. Note that an enterprise might dedicate some hardware resources to computer platform that is rarely, if ever, used. For example, a designer might create a test version of a computer platform and arrange to have sufficient hardware resources dedicated to support the test platform. After he or she has finished testing the platform, however, there might not be a need to continue to use that particular platform. The enterprise might be reluctant to re-use the hardware resources for other purposes (e.g., because the test platform might need to be re-created at a later time, which can be a difficult task when various configuration parameters can only be found in supporting documentation, such as word processing files). As a result, an enterprise might find that a substantial amount of hardware resources are rarely, if ever, used.

Figure 13:
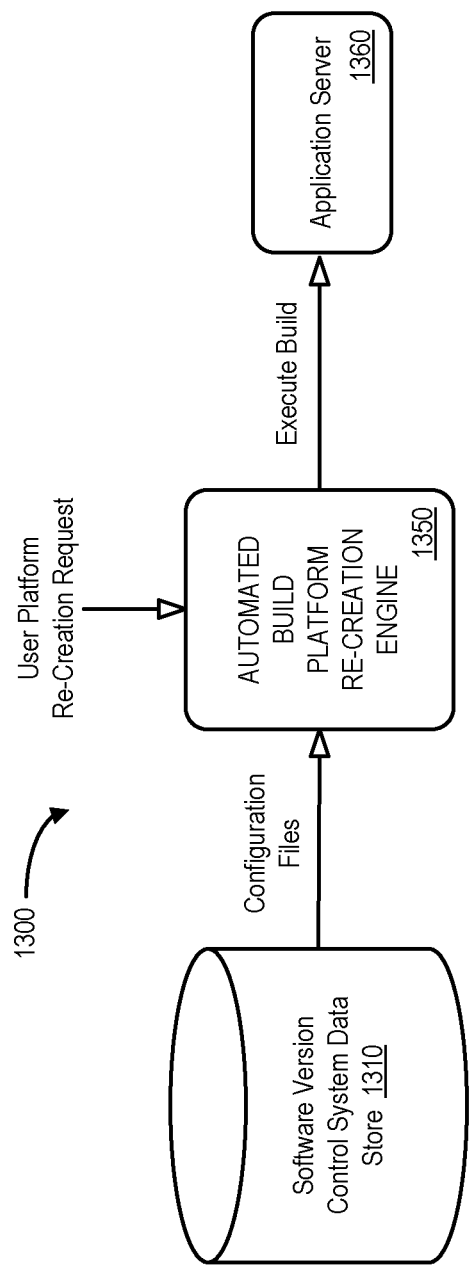
FIG. 13 is a high-level block diagram of a platform re-creation system according to some embodiments.

It would therefore be desirable to provide systems and methods to accurately and efficiently facilitate automated platform provisioning and re-creation for an enterprise, while allowing for flexibility and effectiveness when creating, reviewing, and/or re-creating platforms as appropriate. FIG. 13 is a high-level block diagram of a platform re-creation system 1300 according to some embodiments. The system 1300 includes an automated build platform re-creation engine 1350 that is able to receive one or more configuration files from a software version control system data store 1310. The software version control system data store 1310 might be associated with, for example, a software versioning and revision control system such as SVN or GIT.

The automated build platform re-creation engine 1350 may also receive a user platform re-creation request and initiate a build execution via an application server 1360. In this way, the system 1300 may let an enterprise destroy platforms (and re-use the associated hardware resources) knowing that the platforms can be consistently and accurately re-created at a later time if necessary.

Figure 14:
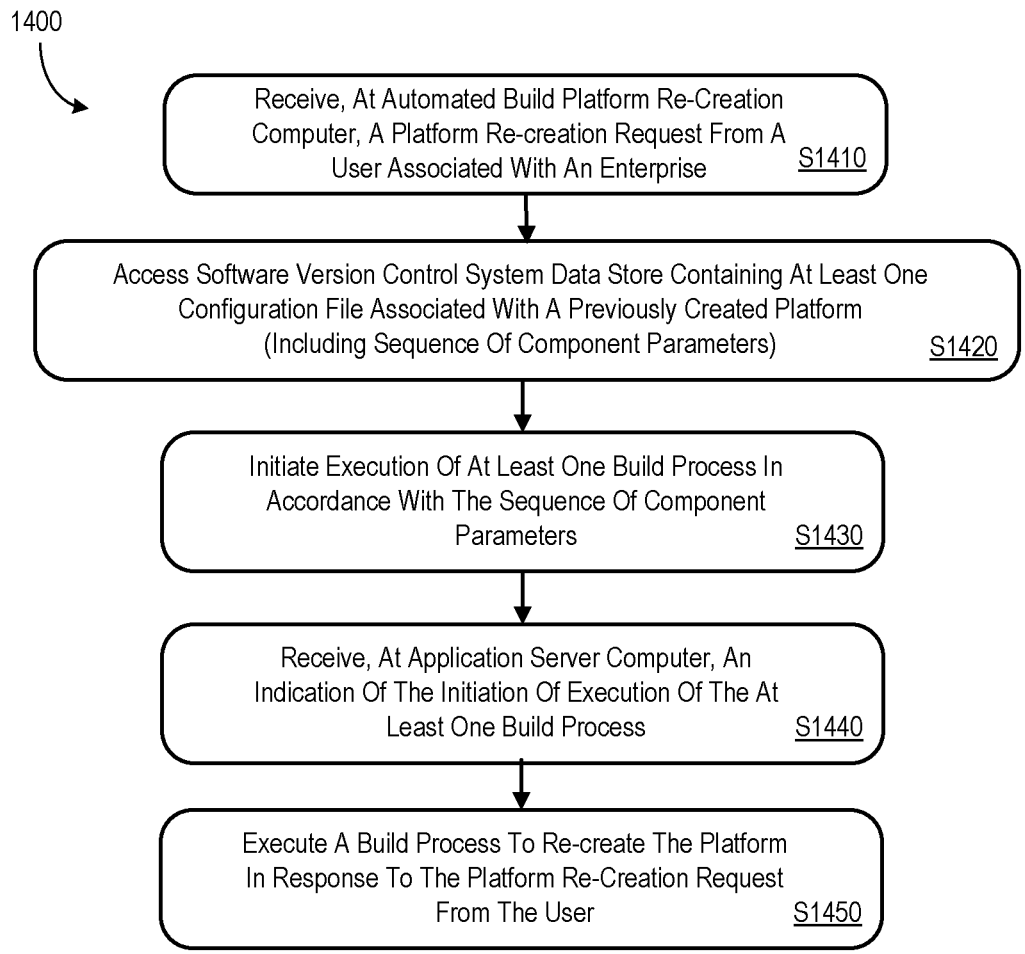
FIG. 14 illustrates a platform re-creation method according to some embodiments.

FIG. 14 illustrates a platform re-creation method 1400 according to some embodiments. At S1410, an automated build platform re-creation computer may receive a platform re-creation request from a user associated with the enterprise. As used herein, the term "platform" re-creation request might refer to, for example, an entire platform (including the infrastructure) or any portion, segments, or components of such a platform. At S1420, responsive to the received platform re-creation request, the system may access a software version control system data store. The software version control system data store may contain, for example, at least one configuration file associated with a previously created platform, the configuration file including a sequence of component parameters. According to some embodiments, the configuration file is written in a human-readable data serialization language. For example, the human-readable data serialization language might be associated with a YAML data file, a text configuration file, and/or an extendable markup language file (e.g., an XML file). According to some embodiments, the sequence of component parameters in the configuration file may define a web server, an application server, and a database server. For example, the web server may be associated with a first virtual machine of a web hosting tier, the application server may be associated with a second virtual machine of an application container tier, and/or the database server may be associated with a third virtual machine of a database instance tier. According to some embodiments, the sequence of component parameters further defines a network component, a network balancer, middleware services, etc.

At S1430, the system may initiate execution of at least one build process in accordance with the sequence of component parameters. At S1440, an application server computer may receive an indication of the initiation of execution of the at least one build process. According to some embodiments, the automated build platform re-creation computer and the at least one application server computer compile information from the configuration file into a deployable artifact. Note that the at least one application server computer might be associated with, for example, a Weblogic server, a JBoss server, a Tomcat server, a network server, a DNS server, a database server, a Structured Query Language ("SQL") protocol server, an OS server, etc.

At S1450, responsive to the received indication, the application server computer (or computers) may execute a build process to re-create the platform in response to the platform re-creation request from the user (resulting in a platform, applications server, deployable unit, a component, portion, or segment of a platform, etc.). According to some embodiments, the automated build platform re-creation computer may also implement a configuration consistency verification procedure (e.g., to ensure that the re-created platform accurately reflects the previous platform). In addition to re-creating a platform, some embodiments of the present invention may implement an automated build platform de-creation computer. As used herein, the term "de-creation" may refer to the destruction, decommissioning, temporary suspension, etc. of a platform (and related infrastructure components), or portions, components, or segments of such a platform. For example, an automated build platform de-creation computer may receive a platform de-creation request from a user associated with the enterprise. The platform de-creation request may indicate, according to some embodiments, that components of a currently deployed platform are no longer needed by the enterprise. Responsive to the received platform de-creation request, the automated build platform de-creation computer may arrange for computing resources associated with the platform to be released. The automated build platform de-creation computer may then store information about the released computing resources into the software version control system data store for later use by the automated build platform re-creation computer. The stored information might include, for example, hardware data, software version data, etc. In this way, an enterprise may improve utilization of system resources and components (e.g., memory, computing power, etc.) because user's will be more likely to release these resources knowing that a platform can be easily and accurately be re-created at a later time (e.g., for testing or auditing purposes).

Figure 15:
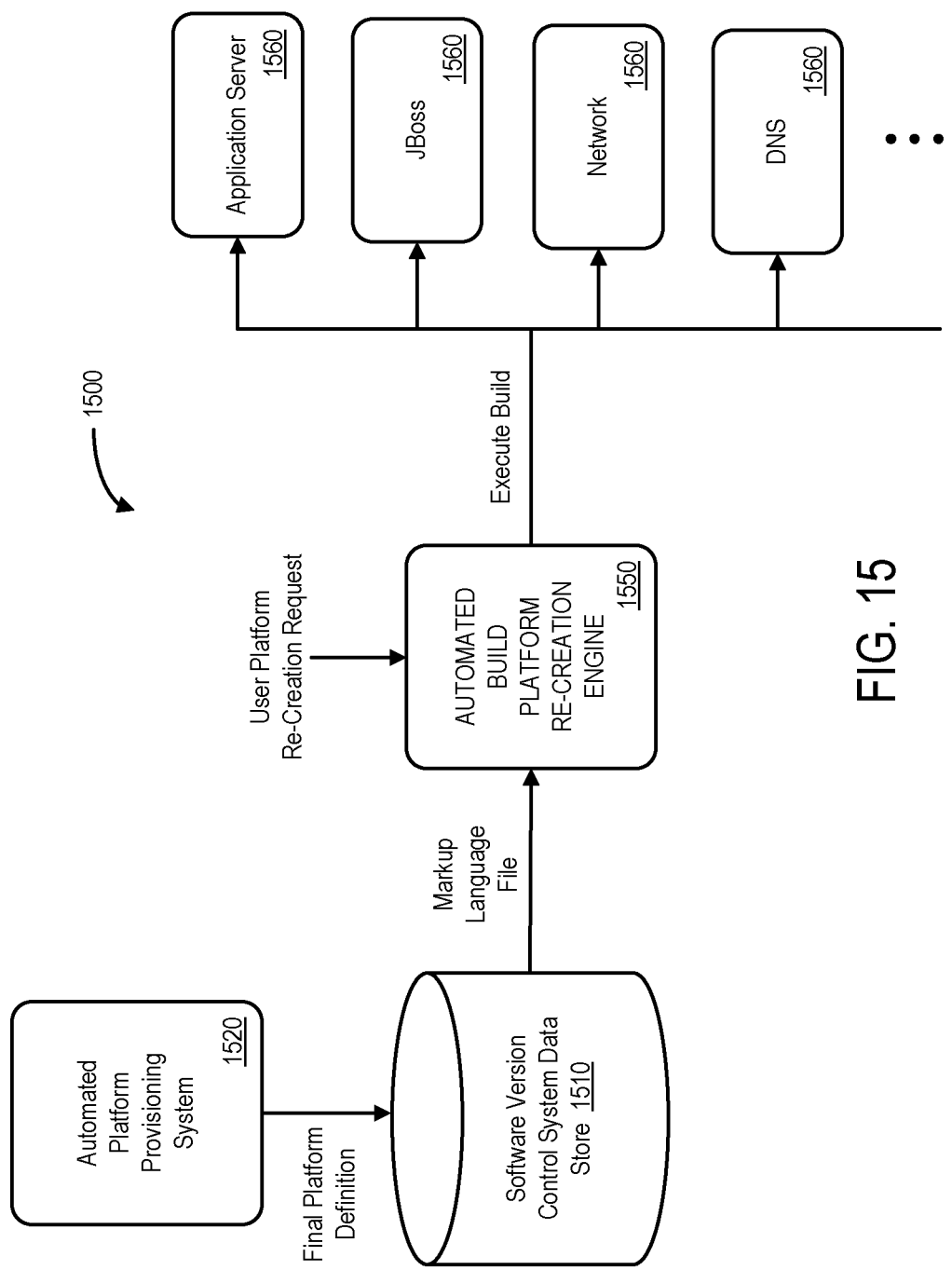
FIG. 15 illustrates an information flow implementing a full stack delivery for platform re-creation in accordance with some embodiments.

FIG. 15 illustrates an information flow 1500 implementing full stack delivery for platform re-creation in accordance with some embodiments. As before, the system 1500 includes an automated build platform re-creation engine 1550 that is able to receive one or more markup language files from a software version control system data store 1510. The software version control system data store 1510 might receive, for example, a final platform definition from an automated platform provisioning system 1520 in accordance with any of the embodiments described herein (e.g., in connection with FIGS. 1 through 9). The automated build platform re-creation engine 1550 may also receive a user platform re-creation request and initiate a build execution via an application server 1560 (e.g., associated with JBoss, network, DNS, etc.). In this way, the system 1500 may let an enterprise confidently destroy platforms (and re-use the associated hardware resources) knowing that the platforms can be accurately re-created at any time in the future.

Figure 16:
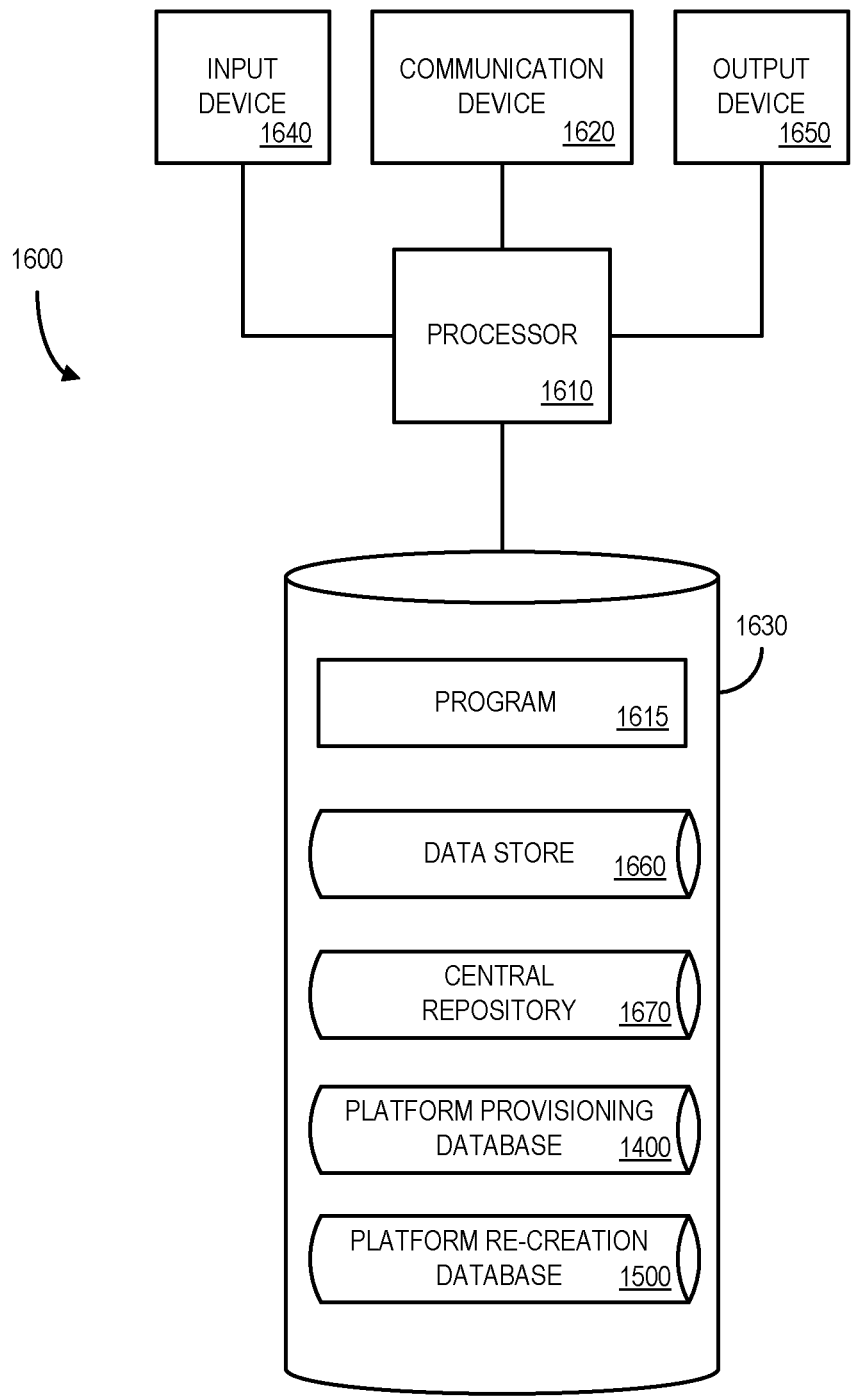
FIG. 16 is a block diagram of an apparatus in accordance with some embodiments of the present invention.

The embodiments described herein may be implemented using any number of different hardware configurations. For example, FIG. 16 illustrates an automated platform provisioning system 1600 that may be, for example, associated with the system 100 of FIG. 1. The automated platform provisioning system 1600 comprises a processor 1610, such as one or more commercially available Central Processing Units ("CPUs") in the form of one-chip microprocessors, coupled to a communication device 1620 configured to communicate via a communication network (not shown in FIG. 16). The communication device 1620 may be used to communicate, for example, with one or more remote user terminals, data stores, and/or or other communication devices (e.g., PCs and smartphones). Note that communications exchanged via the communication device 1620 may utilize security features, such as those between a public internet user and an internal network of the insurance enterprise. The security features might be associated with, for example, web servers, firewalls, and/or PCI infrastructure. The automated platform provisioning system 1600 further includes an input device 1640 (e.g., a mouse and/or keyboard to enter information about platform profiles, hardware resources, component binding data, etc.) and an output device 1650 (e.g., to output reports regarding system administration, hardware allocations, current platform statuses, re-creation requests, etc.).

The processor 1610 also communicates with a storage device 1630. The storage device 1630 may comprise any appropriate information storage device, including combinations of magnetic storage devices (e.g., a hard disk drive), optical storage devices, mobile telephones, and/or semiconductor memory devices. The storage device 1630 stores a program 1615 and/or a risk relationship management engine or application for controlling the processor 1610. The processor 1610 performs instructions of the program 1615, and thereby operates in accordance with any of the embodiments described herein. For example, the processor 1610 may receive a platform request from a user associated with the enterprise. The processor 1610 may then identify, based on electronic data records in a platform resource computer store, a resource bundle of components appropriate in view of the platform request. According to some embodiments, the processor 1610 may provide input data to an asynchronous REST API service and store final platform definition information for the enterprise into a central repository. The processor 1610 may also execute IaaS and PaaS automation components and utilize a return service to generate infrastructure binding data to couple components in the resource bundle to each other.

According to some embodiments, the processor 1610 may receive a platform re-creation request from a user associated with the enterprise. Responsive to the received platform re-creation request, the processor 1610 may access a software version control system data store containing at least one configuration file associated with a previously created platform (e.g., the configuration file including a sequence of component parameters). The processor 1610 may then initiate execution of at least one build process in accordance with the sequence of component parameters. An application server computer may receive an indication of the initiation of execution of the at least one build process and execute a build process to re-create the platform in response to the platform re-creation request from the user.

The program 1615 may be stored in a compressed, uncompiled and/or encrypted format. The program 1615 may furthermore include other program elements, such as an operating system, a database management system, and/or device drivers used by the processor 1610 to interface with peripheral devices.

As used herein, information may be "received" by or "transmitted" to, for example: (i) the back-end application computer server 1600 from another device; or (ii) a software application or module within the back-end application computer server 1600 from another software application, module, or any other source.

In some embodiments (such as shown in FIG. 16), the storage device 1630 further stores a computer data store 1660 (e.g., associated with available computing resources, hardware parameters, etc.), central repository 1670 (e.g., storing final platform definitions), a platform provisioning database 1700, and a platform re-creation database 1800. Examples of databases that might be used in connection with the automated platform provisioning system 1600 will now be described in detail with respect to FIGS. 17 and 18. Note that the databases described herein are only examples, and additional and/or different information may be stored therein. Moreover, various databases might be split or combined in accordance with any of the embodiments described herein. For example, the computer data store 1660 and/or platform provisioning database 1700 might be combined and/or linked to each other within the program 1615.

Figure 17:
FIG. 17 is a portion of a tabular platform provisioning database in accordance with some embodiments.

Referring to FIG. 17, a table is shown that represents the platform provisioning database 1700 that may be stored at the automated platform provisioning system 1600 according to some embodiments. The table may include, for example, entries associated with computer platforms that have been (or are being) created in response to user requests. The table may also define fields 1702, 1704, 1706, 1708, 1710, 1712 for each of the entries. The fields 1702, 1704, 1706, 1708, 1710, 1712 may, according to some embodiments, specify: a platform request identifier 1702, a selected profile 1704, a base service level 1706, extensions 1708, a date (time) received 1710, and a status 1712. The platform provisioning database 1700 may be created and updated, for example, based on information electrically received from a user, a provisioning apparatus, etc.

The platform request identifier 1702 may be, for example, a unique alphanumeric code identifying a request for a platform that was submitted by a user (e.g., associated with an enterprise). The selected profile 1704 might indicate, for example, a set of hardware resources that might be appropriate in view of the user's request. The base service level 1706 and extensions 1708 may further define aspects of the desired platform. The date (time) received 1710 might indicate when he or she submitted the request and the status 1712 might indicate, for example, whether the request is "complete" or still "in process."

Figure 18:
FIG. 18 is a portion of a tabular platform re-creation database in accordance with some embodiments.

Referring to FIG. 18, a table is shown that represents the platform re-creation database 1800 that may be stored at the automated platform provisioning system 1600 according to some embodiments. The table may include, for example, entries associated with previously established computer platforms that a user in interested in re-creating for an enterprise. The table may also define fields 1802, 1804, 1806, 1808, 1810 for each of the entries. The fields 1802, 1804, 1806, 1808, 1810 may, according to some embodiments, specify: a re-creation request identifier 1802, a YAML file 1804, a date (time) received 1806, a status 1808, and an indication of whether or not the configuration has been verified 1810. The platform re-creation database 1800 may be created and updated, for example, based on information electrically received from a user, a provisioning apparatus, etc.

The recreation request identifier 1802 may be, for example, a unique alphanumeric code identifying a request to re-create a previously existing platform that was submitted by a user (e.g., associated with an enterprise). The YAML file 1804 might indicate, for example, a configuration file including file paths, configuration parameters, file names, etc. The date (time) received 1806 might indicate when he or she submitted the request and the status 1808 might indicate, for example, whether the request is "complete" or still "pending." The configuration verified indication 1810 might, for example, reflect whether or not a re-created platform has been confirmed to have the proper software versions, configuration parameters, etc.

Thus, embodiments may accurately and efficiently facilitate automated platform provisioning for an enterprise, while allowing for flexibility and effectiveness when creating, reviewing, and/or re-creating platforms as appropriate.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 19:
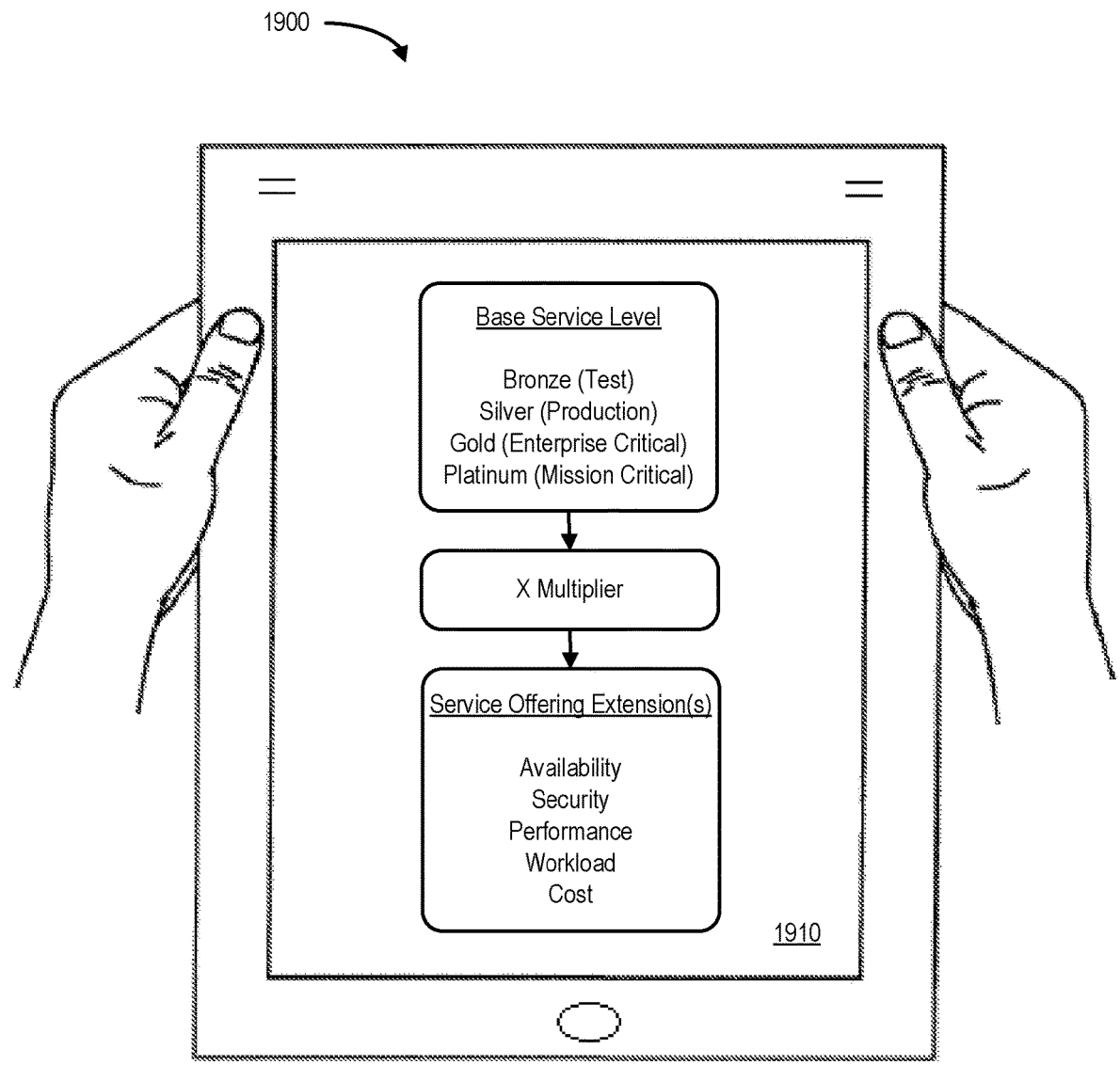
FIG. 19 illustrates a tablet computer displaying a platform provisioning user interface according to some embodiments.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to particular types of communication addresses, embodiments may instead be associated with other types of communications (e.g., chat implementations, web-based messaging, etc.). Similarly, although a certain number of computing components were provided in connection some embodiments described herein, other numbers of components (and different types of components) might be used instead. Still further, the displays and devices illustrated herein are only provided as examples, and embodiments may be associated with any other types of user interfaces. For example, FIG. 19 illustrates a handheld tablet computer 1900 displaying a platform provisioning display 1910 according to some embodiments. The platform provisioning display 1910 might include various platform options (e.g., service levels, extensions, etc.) that can be selected and/or modified by a user of the handheld computer 1900 (e.g., to see additional information, define a new platform to be created, etc.).

Figure 20:
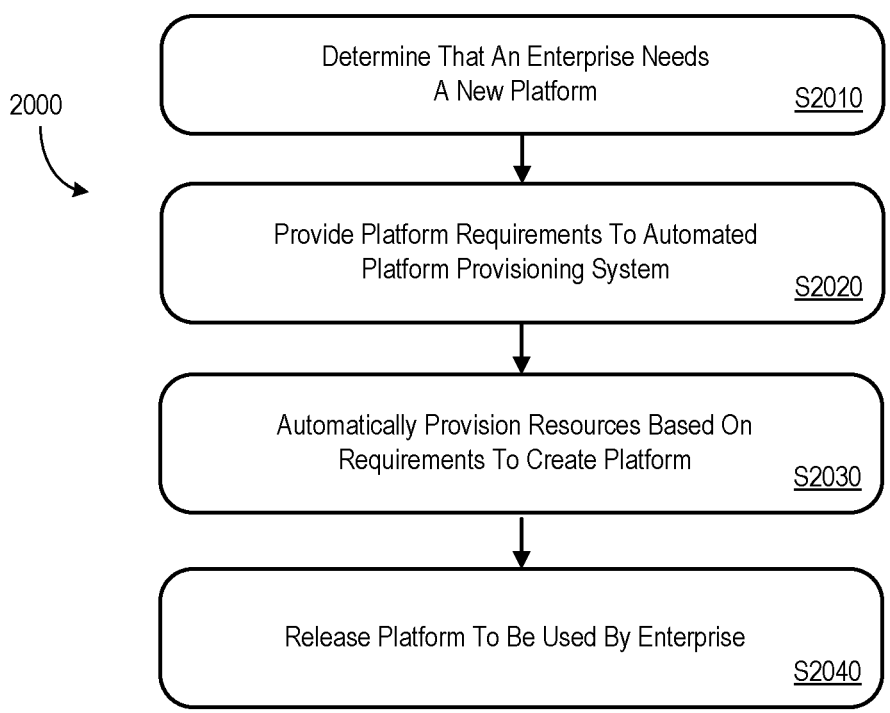
FIG. 20 is an example of automated platform provisioning for an enterprise in accordance with some embodiments.

Although embodiments have been described with respect to specific types of enterprises, embodiments may be utilized in many different enterprise workflows. For example, FIG. 20 is an example of automated platform provisioning 2000 for an enterprise in accordance with some embodiments. At S2010, a system may determine that an enterprise needs a new platform. For example, a business might determine that it needs a new web-based platform to let users view and update purchase orders. At S2020, a user may provide platform requirements to an automated platform provisioning system. For example, a user might indicate how many simultaneous employees might access the platform, how quickly the platform should respond to employee requests, etc. At S2030, the system may automatically provision resources based on the requirements to create the platform in accordance with any of the embodiments described herein. For example, a web server, application server, database server, etc. might be automatically created and bound together as appropriate. At S2040, the system may release the platform to be used by the enterprise. For example, employees might be begin to use the platform to view and update business information (such as purchase orders) to facilitate the operation of the enterprise.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A system to automate platform provisioning for an enterprise, comprising:
   (a) a platform resource computer store containing a set of electronic data records, each electronic data record including a component identifier and a set of computing characteristic values;
   (b) a profile engine computer, coupled to the platform resource computer store, programmed to:
      (i) receive a platform request from a user associated with the enterprise, wherein the platform request is associated with a base service level, a multiplier, and at least one service offering extension, (ii) identify, based on the electronic data records in the platform resource computer store, a resource bundle of components appropriate in view of the platform request, and (iii) output platform requirements based at least in part on the identified resource bundle of components;

(c) a platform generator system computer, coupled to the profile engine computer, programmed to:

(i) receive the platform requirements from the profile engine computer, (ii) provide input data to an asynchronous representational state transfer application programming interface service, and (iii) store final platform definition information for the enterprise into a central repository;

(d) a platform provisioning system computer, coupled to the platform generator system computer, programmed to:

(i) process Infrastructure-as-a-Service automation components, (ii) process Platform-as-a-Service automation components, (iii) utilize a return service to generate infrastructure binding data to couple components in the resource bundle to each other;

(e) the central repository to store the final platform definition information in response to the platform request received from the user; and (f) an automated build platform de-creation computer, programmed to:

(i) receive a platform de-creation request from the user associated with the enterprise, the platform de-creation request indicating that components of a currently deployed platform are no longer needed by the enterprise, (ii) responsive to the received platform de-creation request, arrange for computing resources associated with the platform to be released, and (iii) store information about the released computing resources into a software version control system data store for later use by the platform provisioning system computer, wherein the central repository is further to provide feedback data to the profile engine computer, the feedback data being used by the profile engine computer to improve responses to future platform requests from users, the feedback data including: (i) a component add, (ii) a component change, (iii) a component delete, (iv) a capacity adjustment, (v) a data change, (vi) a performance objective change, (vii) a service level change, and (viii) lifestyle event data.

2. The system of claim 1, further comprising:

(g) a communication port coupled to the profile engine computer to facilitate an exchange of electronic messages, via a distributed cloud-based communication network, to present an interactive graphical user interface at a remote user terminal associated with the user.

3. The system of claim 1, wherein the identified resource bundle of components includes a web server, an application server, and a database server.

4. The system of claim 3, wherein: (i) the web server is associated with a first virtual machine of a web hosting tier, (ii) the application server is associated with a second virtual machine of an application container tier, and (iii) the database server is associated with a third virtual machine of a database instance tier.

5. The system of claim 4, wherein the resource bundle of components further includes at least one of: (i) a network component, (ii) a network balancer, and (iii) middleware services.

6. The system of claim 1, wherein the binding of resources to each other is associated with at least one of: (i) a request proxy, (ii) a datasource, (iii) an internet protocol address, and (iv) a port range.

7. The system of claim 1, wherein the platform request is associated with at least one of: (i) a standardized service template, (ii) a pre-defined profile, (iii) a customized profile, (iv) a set of individual micro infrastructure service definitions, (v) platform input data, (vi) a user defined filter, (vii) an application profile, (viii) a questionnaire, (ix) an enterprise web application interaction, (x) a bundles services input template, and (xi) a user selection of computing resource units.

8. The system of claim 7, wherein the platform request is associated with at least one of: (i) a framework template, (ii) a runtime template, (iii) a middleware template, (iv) an operating system template, (v) a native service template, (vi) a load balanced, auto-scaled website, (vii) a relational database management system, (viii) a JBoss stack, layer, instances, and associated resources, (ix) website hosting with domain name services entry, and (x) identity and access management.

9. The system of claim 8, wherein the platform request generates a platform as a service application programming interface reference including: (i) a data type, (ii) common parameters, (iii) common errors, and (iv) regions and endpoints.

10. The system of claim 1, wherein the service offering extension includes at least one of: (i) availability, (ii) security, (iii) performance, (iv) agility, (v) workload, (vi) support, (vii) capabilities, (viii) cost, and (ix) monitoring ability.

11. The system of claim 1, wherein the Infrastructure-as-a-Service automation components are associated with at least one of: (i) compute, (ii) network, and (iii) storage.

12. The system of claim 1, wherein the Platform-as-a-Service automation components are associated with at least one of: (i) object storage, (ii) identity, (iii) runtime, (iv) queue, (v) database, (vi) cloud modeling framework, (vii) data types, (viii) common data types, (ix) common errors, and (x) regions and endpoints.

13. The system of claim 1, wherein the platform request is associated with at least one of: (i) a standardized service template, (ii) a pre-defined profile, (iii) a customized profile, (iv) a set of individual micro infrastructure service definitions, and (v) platform input data.

14. A computerized method to automate platform provisioning for an enterprise, comprising:

receiving, at a profile engine computer, a platform request from a user associated with the enterprise, wherein the platform request is associated with a base service level, a multiplier, and at least one service offering extension;

identifying, based on electronic data records in a platform resource computer store, a resource bundle of components appropriate in view of the platform request;

outputting platform requirements based at least in part on the identified resource bundle of components;

receiving, by a platform generator system computer, the platform requirements from the profile engine computer;

providing input data to an asynchronous representational state transfer application programming interface service;

storing the final platform definition information for the enterprise into a central repository;

processing, by a platform provisioning system computer, Infrastructure-as-a-Service automation components;

processing, by the platform provisioning system computer, Platform-as-a-Service automation components;

utilizing a return service to generate infrastructure binding data to couple components in the resource bundle to each other;

receiving, at an automated build platform de-creation computer, a platform de-creation request from the user associated with the enterprise, the platform de-creation request indicating that components of a currently deployed platform are no longer needed by the enterprise;

responsive to the received platform de-creation request, arranging, by the automated build platform de-creation computer, for computing resources associated with the platform to be released;

storing, by the automated build platform de-creation computer, information about the released computing resources into a software version control system data store for later use by the platform provisioning system computer;

providing, by the central repository to the profile engine computer, feedback data; and using, by the profile engine computer, the feedback data to improve responses to future platform requests from users, the feedback data including: (i) a component add, (ii) a component change, (iii) a component delete, (iv) a capacity adjustment, (v) a data change, (vi) a performance objective change, (vii) a service level change, and (viii) lifestyle event data.

15. The method of claim 14, wherein the identified resource bundle of components includes a web server, an application server, and a database server.

16. The method of claim 14, wherein the platform request is associated with at least one of: (i) a standardized service template, (ii) a pre-defined profile, (iii) a customized profile, (iv) a set of individual micro infrastructure service definitions, (v) platform input data, (vi) a user defined filter, (vii) an application profile, and (viii) a questionnaire.

17. A system to automate platform provisioning for an enterprise, comprising:
(a) a platform resource computer store containing a set of electronic data records, each electronic data record including a component identifier and a set of computing characteristic values;
(b) a profile engine computer, coupled to the platform resource computer store, programmed to:
  (i) receive a platform request from a user associated with the enterprise, wherein the platform request is associated with a base service level, a multiplier, and at least one service offering extension,
  (ii) identify, based on the electronic data records in the platform resource computer store, a resource bundle of components appropriate in view of the platform request, the identified resource bundle of components including a web server, an application server, and a database server, and
  (iii) output platform requirements based at least in part on the identified resource bundle of components;
(c) a platform generator system computer, coupled to the profile engine computer, programmed to:
  (i) receive the platform requirements from the profile engine computer,
  (ii) provide input data to an asynchronous representational state transfer application programming interface service, and
  (iii) store final platform definition information for the enterprise into a central repository;
(d) a platform provisioning system computer, coupled to the platform generator system computer, programmed to:
  (i) process Infrastructure-as-a-Service automation components,
  (ii) process Platform-as-a-Service automation components, and
  (iii) utilize a return service to generate infrastructure binding data to couple components in the resource bundle to each other;
(e) the central repository to store the final platform definition information in response to the platform request received from the user;
(f) a communication port coupled to the profile engine computer to facilitate an exchange of electronic messages, via a distributed cloud-based communication network, to present an interactive graphical user interface at a remote user terminal associated with the user; and
(g) an automated build platform de-creation computer, programmed to:
  (i) receive a platform de-creation request from the user associated with the enterprise, the platform de-creation request indicating that components of a currently deployed platform are no longer needed by the enterprise,
  (ii) responsive to the received platform de-creation request, arrange for computing resources associated with the platform to be released, and
  (iii) store information about the released computing resources into a software version control system data store for later use by the platform provisioning system computer, wherein the central repository is further to provide feedback data to the profile engine computer, the feedback data being used by the profile engine computer to improve responses to future platform requests from users, the feedback data including: (i) a component add, (ii) a component change, (iii) a component delete, (iv) a capacity adjustment, (v) a data change, (vi) a performance objective change, (vii) a service level change, and (viii) lifestyle event data.

18. The system of claim 17, wherein: (i) the web server is associated with a first virtual machine of a web hosting tier, (ii) the application server is associated with a second virtual machine of an application container tier, and (iii) the database server is associated with a third virtual machine of a database instance tier.

* * * * *